US012639824B2

(12) United States Patent
Nevatie et al.

(10) Patent No.: US 12,639,824 B2
(45) Date of Patent: May 26, 2026

(54) IMAGE PROCESSING METHOD AND APPARATUS FOR SEGMENTING IMAGES

(71) Applicant: TGI SPORT VIRTUAL TECHNOLOGIES LIMITED, London (GB)

(72) Inventors: Niko Nevatie, Helsinki (FI); Erkki Parkkulainen, Helsinki (FI)

(73) Assignee: TGI SPORT VIRTUAL TECHNOLOGIES LIMITED, London (GB)

( * ) Notice: Subject to any disclaimer, the term of this patent is extended or adjusted under 35 U.S.C. 154(b) by 397 days.

(21) Appl. No.: 18/189,447

(22) Filed: Mar. 24, 2023

(65) Prior Publication Data
US 2023/0306611 A1      Sep. 28, 2023

(30) Foreign Application Priority Data

Mar. 24, 2022    (GB) ..................................... 2204196

(51) Int. Cl.
*G06T 7/194*       (2017.01)
*G06V 10/75*       (2022.01)

(52) U.S. Cl.
CPC ............ *G06T 7/194* (2017.01); *G06V 10/751* (2022.01); *G06T 2207/20081* (2013.01)

(58) Field of Classification Search
CPC . G06T 7/194; G06T 2207/20081; G06T 7/11; G06T 2207/20084; G06T 11/60; G06T 19/006; G06V 10/751; G06V 10/28
See application file for complete search history.

(56) References Cited

U.S. PATENT DOCUMENTS 9,965,865 B1 *    5/2018   Agrawal ............ G06V 10/7747
10,242,449 B2 *   3/2019   Liston ..................... G06T 11/60
(Continued)

FOREIGN PATENT DOCUMENTS

CN        108229478 A      6/2018
CN        108596184 A      9/2018
(Continued)

OTHER PUBLICATIONS

Ghassab, V. K., Maanicshah, K., Bouguila, N., & Green, P. (Dec. 2020). REP-Model: A deep learning framework for replacing ad billboards in soccer videos. In 2020 IEEE International Symposium on Multimedia (ISM) (pp. 149-153). IEEE (Year: 2020).*
(Continued)

*Primary Examiner* — Utpal D Shah
*Assistant Examiner* — Jack Peter Kraynak
(74) *Attorney, Agent, or Firm* — Myers Bigel, P.A.

(57)      ABSTRACT

Aspects of the present invention relate to a computer-implemented training method for training a segmentation model to segment an image. The method includes receiving a plurality of first training data sets for training the segmentation model. The first training data sets each include first image data representing a first image comprising a foreground and a background. The first image data is captured by at least one visible electromagnetic radiation imaging device. The method comprises, for each first training data set, generating a first target segmentation for differentiating between the foreground and the background of the first image. The first image data is processed using the segmentation model to segment the first image and generate a first candidate segmentation. The segmentation model compares the first candidate segmentation and the first target segmentation to determine a first error. The segmentation model is updated in dependence on the determined first error. Accord- (Continued)

ing to a further aspect of the present invention there is provided a system for training a segmentation model to segment an image. Aspects of the present invention also relate to an image processing system and method.

23 Claims, 12 Drawing Sheets

(56) References Cited

U.S. PATENT DOCUMENTS

| | | | |
|---|---|---|---|
| 10,255,681 B2 | 4/2019 | Price et al. | |
| 10,713,794 B1 | 7/2020 | He et al. | |
| 10,860,836 B1 | 12/2020 | Tyagi et al. | |
| 11,341,653 B2 | 5/2022 | Kim et al. | |
| 12,086,995 B2* | 9/2024 | Benou | G06V 10/454 |
| 12,165,284 B2* | 12/2024 | Zhang | G06T 11/001 |
| 2005/0001852 A1 | 1/2005 | Dengler et al. | |
| 2007/0269108 A1* | 11/2007 | Steinberg | G06T 7/11 |
| | | | 382/164 |
| 2015/0163416 A1 | 6/2015 | Nevatie | |
| 2016/0028968 A1* | 1/2016 | Affaticati | H04N 5/2723 |
| | | | 348/47 |
| 2017/0324889 A1* | 11/2017 | Nevatie | H04N 23/72 |
| 2018/0176484 A1 | 6/2018 | Nevatie | |
| 2018/0189951 A1 | 7/2018 | Liston et al. | |
| 2018/0253865 A1* | 9/2018 | Price | G06N 3/045 |
| 2018/0324382 A1 | 11/2018 | Rantalainen | |
| 2019/0220983 A1* | 7/2019 | Price | G06T 7/11 |
| 2019/0222777 A1* | 7/2019 | Lovemelt | H04N 23/55 |
| 2020/0267334 A1* | 8/2020 | Cyrus | G06T 7/194 |
| 2020/0364877 A1 | 11/2020 | Bradski et al. | |
| 2021/0034901 A1* | 2/2021 | Chen | G06T 7/90 |
| 2021/0166393 A1* | 6/2021 | Ramani | G06T 7/70 |
| 2021/0279503 A1 | 9/2021 | Qi et al. | |
| 2021/0366128 A1 | 11/2021 | Kim et al. | |
| 2022/0044365 A1 | 2/2022 | Zhang et al. | |
| 2022/0044366 A1* | 2/2022 | Zhang | G06N 3/08 |
| 2022/0058369 A1 | 2/2022 | Alahmari et al. | |
| 2022/0222791 A1* | 7/2022 | Zhang | G06T 5/40 |
| 2022/0262009 A1 | 8/2022 | Yu et al. | |
| 2022/0272245 A1* | 8/2022 | Chu | H04N 7/157 |
| 2023/0010947 A1* | 1/2023 | Wang | G09G 5/377 |
| 2023/0064450 A1* | 3/2023 | Hiskens | G06T 5/50 |
| 2023/0306612 A1 | 9/2023 | Nevatie et al. | |
| 2023/0306613 A1 | 9/2023 | Nevatie et al. | |
| 2023/0326030 A1 | 10/2023 | Nevatie et al. | |
| 2023/0326031 A1 | 10/2023 | Nevatie et al. | |

FOREIGN PATENT DOCUMENTS

| | | |
|---|---|---|
| CN | 110188760 A | 8/2019 |
| CN | 110189341 A | 8/2019 |
| CN | 110246145 A | 9/2019 |
| CN | 111260679 A | 6/2020 |
| CN | 111667027 A | 9/2020 |
| CN | 112116625 A | 12/2020 |
| CN | 112232364 A | 1/2021 |
| CN | 112489047 A | 3/2021 |
| CN | 113192072 A | 7/2021 |
| CN | 110189341 B | 8/2021 |
| CN | 113515968 A | 10/2021 |
| CN | 114782460 B | 10/2022 |
| GB | 2560219 A | 9/2018 |
| WO | 2013186278 A1 | 12/2013 |
| WO | 2020021067 A1 | 1/2020 |
| WO | 2020156303 A1 | 8/2020 |
| WO | 2022048151 A1 | 3/2022 |

OTHER PUBLICATIONS

Zhang, J., Zhang, Y., & Xu, X. (Jul. 2021). Objectaug: object-level data augmentation for semantic image segmentation. In 2021 inter-national joint conference on neural networks (IJCNN) (pp. 1-8). IEEE. (Year: 2021).*

Wang, K., Liew, J. H., Zou, Y., Zhou, D., & Feng, J. (2019). Panet: Few-shot image semantic segmentation with prototype alignment. In proceedings of the IEEE/CVF international conference on computer vision (pp. 9197-9206). (Year: 2019).*

Hou, Q., & Liu, F. (2019). Context-aware image matting for simultaneous foreground and alpha estimation. In Proceedings of the IEEE/CVF International Conference on Computer Vision (pp. 4130-4139). (Year: 2019).*

G. Hu and J. Clark, "Instance Segmentation Based Semantic Matting for Compositing Applications," in 2019 16th Conference on Computer and Robot Vision (CRV), Kingston, QC, Canada, 2019, pp. 135-142, doi: 10.1109/CRV.2019.00026. (Year: 2019).*

Ghassab, V. K., Maanicshah, K., Bouguila, N., & Green, P. (2020, December). REP-Model: A deep learning framework for replacing ad billboards in soccer videos. In 2020 IEEE International Sympo-sium on Multimedia (ISM) (pp. 149-153). IEEE (Year: 2020).*

"Patents Act 1977: Search Report under Section 17(5)", GB Appli-cation No. GB2204198.2, Sep. 13, 2022, 3 pp.

"Patents Act 1977: Search Report under Section 17(5)", GB Appli-cation No. 2204204.8, Sep. 20, 2022, 4 pp.

"Patents Act 1977: Search Report under Section 17(5)", GB Appli-cation No. GB2204205.5, Sep. 20, 2022, 4 pp.

"Patents Act 1977: Search Report under Section 17(5)", GB Appli-cation No. 2204202.2, Sep. 22, 2022, 3 pp.

"Patents Act 1977: Search Report under Section 17(5)", GB Appli-cation No. GB2204196.6, Oct. 19, 2022, 6 pp.

"Patents Act 1977: Combined Search and Examination Report under Sections 17 and 18(3)", GB Application No. GB2304305.2, Oct. 10, 2023, 5 pp.

"Patents Act 1977: Combined Search and Examination Report under Sections 17 and 18(3)", GB Application No. GB2304308.6, Oct. 10, 2023, 6 pp.

"Patents Act 1977: Combined Search and Examination Report under Sections 17 and 18(3)", GB Application No. GB2304294.8, Oct. 10, 2023, 9 pp.

"Patents Act 1977: Combined Search and Examination Report under Sections 17 and 18(3)", GB Application No. GB2304303.7, Oct. 24, 2023, 12 pp.

"Patents Act 1977: Combined Search and Examination Report under Sections 17 and 18(3)", GB Application No. GB2304297.1, Oct. 24, 2023, 9 pp.

Hou, Qiqi, et al., "Context-Aware Image Matting for Simultaneous Foreground and Alpha Estimation", 2019 IEEE/CVF International Conference on Computer Vision (ICCV), Soul, South Korea, Oct. 27, 2019, pp. 4129-4138.

"International Search Report and Written Opinion of the Interna-tional Searching Authority", International Application No. PCT/EP2023/057625, Jul. 3, 2023, 17 pp.

"International Search Report and Written Opinion of the Interna-tional Searching Authority", International Application No. PCT/EP2023/057628, Jul. 3, 2023, 17 pp.

"International Search Report and Written Opinion of the Interna-tional Searching Authority", International Application No. PCT/EP2023/057618, Jul. 3, 2023, 18 pp.

"International Search Report and Written Opinion of the Interna-tional Searching Authority", International Application No. PCT/EP2023/057624, Jul. 3, 2023, 18 pp.

"International Search Report and Written Opinion of the Interna-tional Searching Authority", International Application No. PCT/EP2023/057626, Jul. 3, 2023, 18 pp.

Arabi, Hossein, et al., "Does Prior Knowledge Enhance Accuracy of Deep Learning-assisted Semantic Segmentation?", 2021 IEEE Nuclear Science Symposium and Medical Imaging Conference (NSS/MIC), Piscataway, NJ, USA, Oct. 16, 2021, 3 pp.

Chen, Yuhua, et al., "Learning Semantic Segmentation from Synthetic Data: A Geometrically Guided Input-Output Adaptation Approach", arXiv:1812.05040v2, arxiv.org, Cornell University, Jan. 13, 2019, 10 pp.

(56) References Cited

OTHER PUBLICATIONS

Chen, Yuhua , et al., "Learning Semantic Segmentation from Synthetic Data: A Geometrically Guided Input-Output Adaptation Approach", ArXiv:1812.05040v1, arxiv.org, Cornell University Library, Dec. 12, 2018, 10 pp.

Cheng, Gong , et al., "Prototype-CNN for Few-Shot Object Detection in Remote Sensing Images", IEEE Transactions on Geoscience and Remote Sensing, vol. 60, May 19, 2021, 10 pp.

Dmitriev, Konstantin , et al., "Learning Multi-Class Segmentations From Single-Class Datasets", 2019 IEEE/CVF Conference on Computer Vision and Pattern Recognition (CVPR), Long Beach, CA, USA, Jun. 15, 2020, pp. 9493-9503.

El Jurdi, Rosana , et al., "High-level prior-based loss functions for medical image segmentation: A survey", Computer Vision and Image Understanding, vol. 210, Jul. 21, 2021.

Ghassab, Vahid Khorasani, et al., "REP-Model: A deep learning framework for replacing ad billboards in soccer videos", 2020 IEEE International Symposium on Multimedia (ISM), Naples Italy, Dec. 2, 2020, pp. 149-153.

Hou, Qiqi , et al., "Context-Aware Image Matting for Simultaneous Foreground and Alpha Estimation", 2019 IEEE/CVF International Conference on Computer Vision (ICCV), Seoul, Korea, Oct. 27, 2019, pp. 4129-4138.

Naveed, Humza , "Survey: Image Mixing and Deleting for Data Augmentation", arXiv:2106.07085v2, arxiv.org, Cornell University Library, Nov. 1, 2021, 15 pp.

No Name , "Using FCNN for multi-class semantic segmentation trained on single class labeled image data", Retrieved from the Internet: URL:https://stats.stackexchange.com/questions/502896/using-fcnn-for-multi-class-semantic-segmentation-trained-on-single-class-labeled . . . [retrieved on Jun. 14, 2023], Dec. 30, 2020, 2 pp.

Wang, Kaixin , et al., "PANet: Few-Shot Image Semantic Segmentation with Prototype Alignment", 2019 IEEE/CVF International Conference on Computer Vision (ICCV), Seoul, Korea, Oct. 27, 2019, pp. 9196-9205.

Zhang, Jiawei , et al., "ObjectAug: Object-level Data Augmentation for Semantic Image Segmentation", 2021 International Joint Conference on Neural Networks (IJCNN), Shenzhen, China, Jul. 18, 2021, 8 pp.

* cited by examiner

IMG1-n    IMS-1 (25-1)    IMS-2 (25-2)

BG1    FG1

SC1

IMK1-n    IMS-2

IMS-1

SGDC-1

IMS-1

FG1

BG1

IMAGE PROCESSING METHOD AND APPARATUS FOR SEGMENTING IMAGES

CROSS-REFERENCE TO RELATED APPLICATION

This application claims priority under 35 USC § 119(a) to UK Patent Application No. GB 2204196.6 filed on Mar. 24, 2022 in the UK Intellectual Property Office, the entire disclosure of which is incorporated herein by reference in its entirety.

TECHNICAL FIELD

The present disclosure relates to an image processing method and apparatus. The image processing method and apparatus comprises an image segmentation model. Aspects of the invention relate to a method of training a segmentation model; an image processing method; an image segmentation system; an image processing system; a non-transitory computer-readable medium; a content replacement system; and a system for training a segmentation model.

BACKGROUND

A method and apparatus for image content replacement is known from WO 2013/186278. A mask signal is used to define a marked area of a video image captured by one or more camera. Alternate image content is selected and applied to the video image to generate a modified image for transmission. The alternate image content is applied to the marked area of the video image to generate the modified image. The marked area may correspond to a billboard to enable the original content displayed on the billboard to be replaced by the alternate image content. The mask signal is generated by capturing an image comprising non-visible electromagnetic radiation emitted by emitters disposed in the billboard. It would be advantageous to provide a system which is operable without a specialist billboard.

It is an aim of the present invention to address one or more of the disadvantages associated with the prior art.

SUMMARY OF THE INVENTION

Aspects and embodiments of the invention provide a computer-implemented training method of training a segmentation model; an image processing method; an image segmentation system; an image processing system; a non-transitory computer-readable medium; a content replacement system; and a system for training a segmentation model as claimed in the appended claims.

According to an aspect of the present invention there is provided a computer-implemented training method for training a segmentation model to segment an image; the method comprising receiving a plurality of first training data sets, the first training data sets each comprising:

first image data representing a first image comprising a foreground and a background, the first image data being captured by at least one visible electromagnetic radiation imaging device;

wherein the method comprises, for each first training data set:

generating a first target segmentation for differentiating between the foreground and the background of the first image; and processing the first image data using the segmentation model, the processing of the first image data comprising:

processing the first image data to segment the first image and generate a first candidate segmentation;

comparing the first candidate segmentation and the first target segmentation to determine a first error; and updating the segmentation model in dependence on the determined first error.

The first target segmentation is used to train the segmentation model. The first target segmentation may be used as a ground truth for training the segmentation model. The first target segmentation may be determined in dependence on first segmentation data. The first segmentation data may comprise first segmentation image data. The first segmentation data may be captured by at least one non-visible electromagnetic radiation imaging device. At least in certain embodiments, the at least one non-visible electromagnetic radiation imaging device may be used to capture image data that may facilitate determination of the first target segmentation. This may be easier than other methods for determining the target segmentation, which may require human input to produce the segmentation. The first segmentation data may be captured at at least substantially the same time as the first image data is captured by the image capture device At least in certain embodiments, a ground truth for training the segmentation model may be defined in dependence on the first segmentation data. The training of the segmentation model may be based on the determined ground truth. The first segmentation data may be captured by at least one non-visible electromagnetic radiation imaging device.

The first image may represent the complete image captured by the visible electromagnetic radiation imaging device. Alternatively, the first image may be a portion (or a sub-set) of a source image. For example, the first image may represent a portion of the source image captured by the at least one visible electromagnetic radiation imaging device. The first image may be a predefined portion of the captured image. The method may comprise selecting the first image from within a source image, for example from within the image captured by the at least one visible electromagnetic radiation imaging device.

The segmentation model comprises a plurality of model parameters (weights). The updating of the segmentation model comprises modifying one or more of the parameters. The segmentation model is trained by modifying the one or more parameters to reduce the error. At least in certain embodiments, the segmentation performed by the segmentation model may be improved.

Updating the segmentation model may comprise adjusting the weight of one or more model parameters to reduce the determined first error. The weights may be adjusted iteratively to reduce the determined error in respect of the or each first training data set. A gradient descent algorithm may be implemented to reduce the first error. The first error may comprise or consist of a first error magnitude.

A first training output may be generated in dependence on the determined first error. The first training output may represent the determined first error. Alternatively, or in addition, the first training output may comprise a modifier for adjusting one or more weights defined in the segmentation model.

The segmentation model is configured to segment pixels (or each pixel group) in the first image into one or more classes. The segmentation model may be configured to segment at least some of the pixels (or at least some of the pixel groups) in the first image into one of a plurality of classes. In certain embodiments, the segmentation model may be configured to segment each pixel (or each pixel group) in the first image into one of a plurality of classes. The one or more classes may be predefined. The pixels (or pixel groups) in each class form an image area. The segmentation model may be configured to segment each pixel into one of at least a first class and a second class. By way of example, the first class may correspond to the foreground of the first image; and the second class may correspond to the background of the first image.

The segmentation model may be configured to perform semantic segmentation, for example to create a mask for the first image. Semantic segmentation comprises segmenting each pixel (or each pixel group) in the first image into a predefined semantic class. One or more of the semantic classes may be predefined. The pixels (or pixel groups) in each semantic class represent a semantic area of the first image. The segmentation comprises identifying the or each semantic area in the first image (referred to herein as a first image semantic area). Alternatively, or in addition, the segmentation may be performed in respect of pixel groups each comprising more than on pixel.

The first image may comprise at least one foreground area occurring in the foreground of the first image. The segmentation model may be configured to segment the first image to determine the at least one foreground area.

The first image may comprise at least one background area occurring in the background of the first image. The segmentation model may be configured to segment the first image to determine the at least one background area.

The first image may comprise at least one mixed image area. The segmentation model may be configured to process the first image data to segment the first image to determine the at least one mixed image area. An example of a mixed image area may be associated with an object, such as a ball, which is moving faster than an exposure rate of the first imaging device. This may result in a motion blur area in the captured image. The moving object may be captured in the foreground of the first image. However, the motion blur area may be a mixture of the foreground and the background of the first image. The segmentation model may classify the motion blur area as a mixed image area simultaneously occurring in the foreground and the background of the first image.

The first segmentation data may comprise one or more subjects of interest occurring in the background of the first image. The first segmentation data may determine an area of the subject of interest. A ground-truth for the segmentation model may be derived from the first segmentation data.

The method may comprise receiving a plurality of training data sets. The method may comprise receiving at least one second training data set. The or each second training data set may comprise second image data. The second image data may represent a second image consisting of either a foreground or a background. The second image data may be captured by at least one visible electromagnetic radiation imaging device.

The second image may represent the complete image captured by the visible electromagnetic radiation imaging device. Alternatively, the second image may be a portion (or a sub-set) of a source image. For example, the second image may represent a portion of the source image captured by the at least one visible electromagnetic radiation imaging device. The second image may be a predefined portion of the captured image. The method may comprise selecting second image from within a source image, for example from within the image captured by the at least one visible electromagnetic radiation imaging device.

In a variant, the first image and the second image may be selected from the same source image. The first image and the second image may comprise respective first and second regions of the same source image. For example, the first and second images may represent first and second portions of the source image captured by the at least one visible electromagnetic radiation imaging device.

Alternatively, or in addition, the method may comprise, in respect of each second training data set, generating a second target segmentation for differentiating between the foreground and the background of the second image. The second target segmentation may be determined in dependence on second segmentation data. The second segmentation data may comprise second segmentation image data. The second segmentation image data may be captured by at least one non-visible electromagnetic radiation imaging device at the same time as the second image data. The method may comprise, for each second training data set, processing the second training data set using the segmentation model. The processing may comprise: segmenting the second image data to generate a second candidate segmentation; comparing the second candidate segmentation and the second target segmentation and determining a second error. The method may comprise updating the segmentation model in dependence on the determined second error.

Alternatively, or in addition, the second training data sets may each comprise annotation data associated with the second image data. The annotation data may determine the presence solely of the foreground or the background in the second image. The method may comprise, for each second training data set, processing the second training data set using the segmentation model. The processing of the second training data set may comprise partitioning the second image data to generate a second candidate segmentation. The annotation data may be used to determine a second error for the second candidate segmentation. The method may comprise generating the second training output in dependence on the determined second error. The method may comprise updating the segmentation model in dependence on the determined second error.

Updating the segmentation model may comprise adjusting the weight of one or more model parameters to reduce the determined second error. The weights may be adjusted iteratively to reduce the determined error in respect of the or each second training data set. A gradient descent algorithm may be implemented to reduce the overall error. The second error may comprise or consist of a second error magnitude.

A second training output may be generated in dependence on the determined second error. The second training output may represent the determined second error. Alternatively, or in addition, the second training output may comprise a modifier for adjusting one or more weights defined in the segmentation model.

The annotation data may define one or more areas as being a foreground area or a background area of the associated image. In a variant, the annotation data may identify the presence of at least one foreground area; and/or the presence of at least one background area.

Alternatively, or in addition, the method may comprise processing the first image data to determine at least one foreground area of the first image and/or to determine at least one background area of the first image. The method may comprise augmenting the first image data by applying a first supplementary image data to the at least one determined foreground area and/or the at least one determined background area to generate first augmented image data. The first supplementary image data may comprise or consist of overlay graphics data. A first augmented training data set may be generated comprising the first augmented image data. The first augmented training data set may be introduced as one of the first training data sets for training the segmentation model.

The first augmented training data set may comprise the first augmented image data and the first segmentation data of the source first training data set. The first target segmentation may be generated in dependence on the first segmentation data. The first augmented image data may be processed using the segmentation model to generate a first candidate segmentation. The first candidate segmentation and the first target segmentation may be compared to determine the first error. A first training output may be generated in dependence on the determined first error. The segmentation model may be updated in dependence on the first determined error.

According to a further aspect of the present invention there is provided a computer-implemented method of processing a first image, the method comprising receiving first image data captured by at least one visible electromagnetic radiation imaging device and representing a first image comprising a foreground and a background;

wherein the method comprises implementing a segmentation model to segment the first image to differentiate between the foreground and the background of the first image. The segmentation model may be configured to segment the first image to identify at least one foreground area and/or at least one background area in the first image.

According to a further aspect of the present invention there is provided a data processing apparatus comprising means to carry out the method(s) described herein.

According to a further aspect of the present invention there is provided a non-transitory computer-readable medium having a set of instructions stored therein which, when executed, cause a processor to perform the method described herein.

According to a further aspect of the present invention there is provided a computer program comprising instructions which, when the program is executed by a computer, cause the computer to carry out the method(s) described herein.

According to a still further aspect of the present invention there is provided an image segmentation system for segmenting an image, the image segmentation system comprising one or more processors; wherein the one or more processors is configured to implement a segmentation model trained according to the method described herein.

The content replacement system may comprise an image segmentation system as described herein.

According to a further aspect of the present invention there is provided a system for training a segmentation model to segment an image; the system comprising at least one processor and at least one memory device; the at least one processor comprising at least one input configured to receive a plurality of first training data sets, the first training data sets each comprising:

first image data representing a first image comprising a foreground and a background, the first image data being captured by at least one visible electromagnetic radiation imaging device;

wherein, in respect of each of the plurality of first training data sets, the at least one processor is configured to:

determine a first target segmentation for differentiating between the foreground and the background of the first image;

process the first image data using the segmentation model, the processing of the first image data comprising:

processing the first image data to segment the first image to generate a first candidate segmentation;

comparing the first candidate segmentation and the first target segmentation to determine a first error; and updating the segmentation model in dependence on the determined first error.

The first image may comprise at least one foreground area occurring in the foreground of the first image. The segmentation model may be configured to process the first image data to segment the first image to determine the at least one foreground area.

The first image may comprise at least one background area occurring in the background of the first image. The segmentation model may be configured to process the first image data to segment the first image to determine the at least one background area.

The first image may comprise at least one mixed image area occurring in the foreground and the background of the first image. The segmentation model may be configured to process the first image data to segment the first image to determine the at least one mixed image area in the foreground and the background of the first image.

The first segmentation data may determine the background of the first image. The first segmentation data may determine one or more subjects of interest in the background of the first image and/or one or more subjects of interest in the foreground of the first image.

The first image may represent the complete image captured by the visible electromagnetic radiation imaging device. Alternatively, the first image may be a portion (or a sub-set) of a source image. For example, the first image may represent a portion of the source image captured by the at least one visible electromagnetic radiation imaging device. The first image may be a predefined portion of the captured image. The processor may be configured to select the first image from within a source image, for example from within the image captured by the at least one visible electromagnetic radiation imaging device.

The first error is determined in dependence on the comparison of the first candidate segmentation and the first target segmentation. Updating the segmentation model may comprise adjusting the weight of one or more model parameters to reduce the determined first error. The weights may be adjusted iteratively to reduce the determined error in respect of the or each first training data set. A gradient descent algorithm may be implemented to reduce the overall error. The first error may comprise or consist of a first error magnitude.

A first training output may be generated in dependence on the determined first error. The first training output may represent the determined first error. Alternatively, or in addition, the first training output may comprise a modifier for adjusting one or more weights defined in the segmentation model.

The at least one input may be configured to receive a plurality of second training data sets. The second training data sets may each comprise second image data, the second image data representing a second image consisting of either a foreground or a background. The second image data may be captured by at least one visible electromagnetic radiation imaging device.

The second image may represent the complete image captured by the visible electromagnetic radiation imaging device. Alternatively, the second image may be a portion (or a sub-set) of a source image. For example, the second image may represent a portion of the source image captured by the at least one visible electromagnetic radiation imaging device. The second image may be a predefined portion of the captured image. The processor may be configured to select the second image from within a source image, for example from within the image captured by the at least one visible electromagnetic radiation imaging device.

In a variant, the first image and the second image may be selected from the same source image. The first image and the second image may comprise respective first and second regions of the same source image. For example, the first and second images may represent first and second portions of the source image captured by the at least one visible electromagnetic radiation imaging device.

The second target segmentation may be determined in dependence on second segmentation data. The second training data sets may each comprise second segmentation data defining the foreground or the background of the second image. The second segmentation data may comprise second segmentation image data. The second segmentation image data may be captured by at least one non-visible electromagnetic radiation imaging device at the same time as the second image data.

In respect of each of the plurality of second training data sets, the at least one processor may be configured to determine a second target segmentation in dependence on the second segmentation data. The at least one processor may be configured to process the second training data set using the segmentation model. The processing may comprise segmenting the second image data to generate a second candidate segmentation. The at least one processor may be configured to compare the second candidate segmentation and the second target segmentation and determine a second error in respect of the second candidate segmentation and the second target segmentation. The at least one processor may be configured to update the segmentation model in dependence on the determined second error.

The second training data sets may each comprise annotation data associated with the second image data. The annotation data may determine the presence solely of a foreground or a background in the second image. In respect of each of the plurality of second training data sets, the at least one processor may be configured to process the second training data set using the segmentation model. The processing may comprise partitioning the second image data to generate a second candidate segmentation. The annotation data may be used to determine a second error for the second candidate segmentation. The segmentation model may be updated in dependence on the determined second error.

Updating the segmentation model may comprise adjusting the weight of one or more model parameters to reduce the determined second error. The weights may be adjusted iteratively to reduce the determined error in respect of the or each second training data set. A gradient descent algorithm may be implemented to reduce the overall error. The second error may comprise or consist of a second error magnitude.

A second training output may be generated in dependence on the determined second error. The second training output may represent the determined second error. Alternatively, or in addition, the second training output may comprise a modifier for adjusting one or more weights defined in the segmentation model.

In respect of each of the plurality of second training data sets, the at least one processor may be configured to process the first image data to determine at least one foreground area of the first image and/or to determine at least one background area of the first image.

The at least one processor may be configured to augment the first image data by applying a first supplementary image data to the at least one determined foreground area and/or the at least one determined background area to generate first augmented image data. The first supplementary image data may comprise or consist of overlay image data. A first augmented training data set may be generated comprising the first augmented image data. The first augmented training data set may be introduced as one of the first training data sets. A further training operation may be performed using the first augmented training data set in place of one of the aforementioned first training data sets.

In respect of each of the plurality of second training data sets, the at least one processor may be configured to process the first image data to determine at least one segment of the first image. The at least one processor may be configured to augment the first image data by applying a first supplementary image data to the at least one determined segment to generate first augmented image data. The at least one processor may be configured to generate a first augmented training data set comprising the first augmented image data; and introduce the first augmented training data set as one of the first training data sets.

According to a further aspect of the present invention there is provided an image processing system for processing an image, the image processing system comprising one or more processors having an electrical input for receiving first image data captured by at least one visible electromagnetic radiation imaging device and representing a first image comprising a foreground and a background;

wherein the one or more processors is configured to implement a segmentation model; the segmentation model is configured to segment the first image to differentiate between the foreground and the background of the first image. The segmentation model may be of the type described herein.

According to a further aspect of the present invention there is provided a computer-implemented method of processing a first image, the method comprising receiving first image data captured by at least one visible electromagnetic radiation imaging device and representing a first image comprising a foreground and a background;

wherein the method comprises implementing a segmentation model to segment the first image to differentiate between the foreground and the background of the first image. The segmentation model may be of the type described herein.

Any control unit or controller described herein may suitably comprise a computational device having one or more electronic processors. The system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller or control unit, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. The control unit or controller may be implemented in software run on one or more processors. One or more other control unit or controller may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
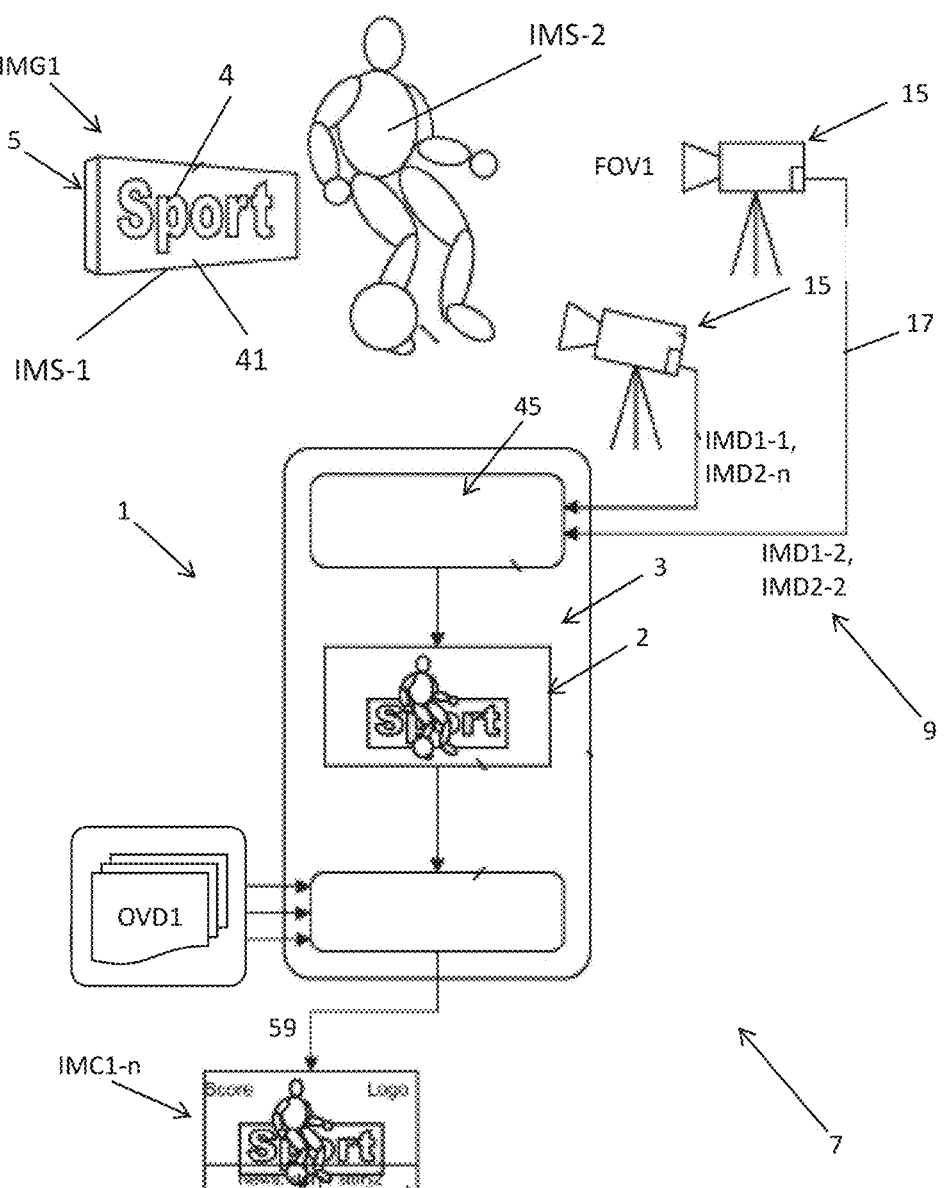
FIG. 1 shows a schematic representation of a broadcasting system incorporating an image processing system in accordance with an embodiment of the present invention.

An image processing system 1 for segmenting a first image IMG1-$n$ in accordance with an embodiment of the present invention is described herein with reference to the accompanying Figures. The image processing system 1 is configured to segment the first image IMG1-$n$ into a plurality of first semantic areas IMS-n. At least in certain embodiments, the segmentation of the first image IMG1-$n$ facilitates generation of a composite image IMC1. The image processing system 1 implements a segmentation model 2 to segment the first image IMG1-$n$. A computer-implemented training method and system for training the segmentation model 2 in accordance with an embodiment of the present invention is also described herein.

The image processing system 1 executes the segmentation model 2 to segment the first image IMG1-$n$ into one or more first image semantic areas IMS-n. The segmentation model 2 in the present embodiment segments the first image IMG1-$n$ to determine a plurality of said first image semantic areas IMS-1. In the present embodiment, the segmentation model 2 is configured to segment the first image IMG1-1 on a per-pixel basis. The segmentation model 2 analyses the first image IMG-n at a pixel level to provide semantic segmentation. The segmentation model 2 may identify parts of the first image IMG1-$n$ having the same semantic classification. The process comprises classifying each pixel in the first image IMG1-$n$. The pixels in the first IMG1-$n$ having the same semantic classification belong to the same first semantic area IMS-1. Alternatively, the process may comprise classifying a plurality of pixel groups. Each pixel group may comprise a plurality of pixels, for example disposed proximal to or adjacent to each other. The pixel groups in the first IMG1-$n$ having the same semantic classification belong to the same first semantic area IMS-1.

The segmentation model 2 segments the first image IMG1-$n$ into N classes (where N is a whole number). In the present embodiment, the segmentation model 2 segments the first image IMG1-$n$ into two classes (i.e. N=2). The classes each represent semantically different classes of pixels. By way of example, the segmentation model 2 may segment the first image IMG1-$n$ into a first class representing one or more first image semantic areas IMS-1, and a second class representing one or more second image semantic areas IMS-2. The or each first image semantic area IMS-1 corresponds to the background of the first image IMG1-$n$; and the or each second semantic area IMS-2 corresponds to the foreground of the first image IMG1-$n$. The segmentation provides a probability of each pixel belonging to each of the predefined classes. By way of example, the segmentation may indicate that a particular pixel has a probability of 10% of belonging to the first class and a probability of 60% of belonging to the second class. In a variant, the segmentation model 2 may segment the first image IMG1-$n$ into more than two classes (i.e. N>2). In a further variant, the segmentation model 2 may segment the first image IMG1-$n$ into a single class (i.e., N=1). In this arrangement, the segmentation model 2 may classify each pixel in the first image IMG1-$n$ as either being in the class or being unclassified. The class represents one of the foreground and the background of the first image IMG1-$n$. The inverse of the class is identified as belonging to the other one of the foreground and the background of the first image IMG1-$n$. It is unusual to obtain a "pure" classification (corresponding to a probability of 0% or 100%) and some amount of uncertainty occurs in respect of each pixel.

Figure 3:
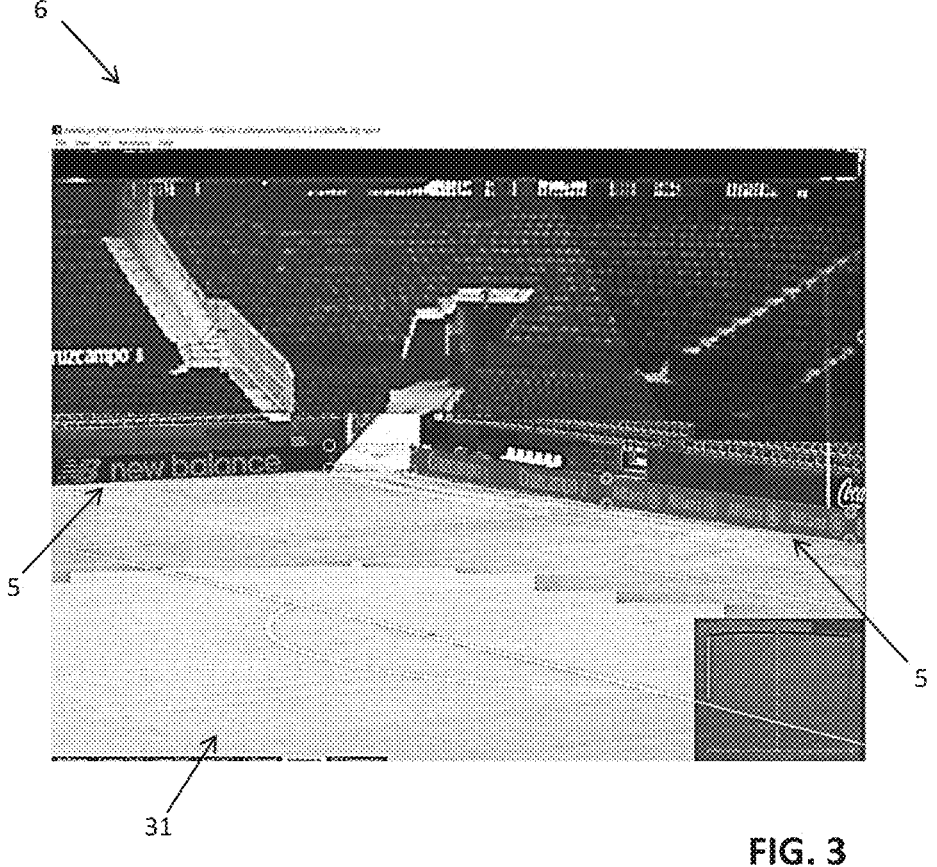
FIG. 3 shows an example representation of a stadium comprising first and second advertising board identified by the segmentation model.
Figure 4:
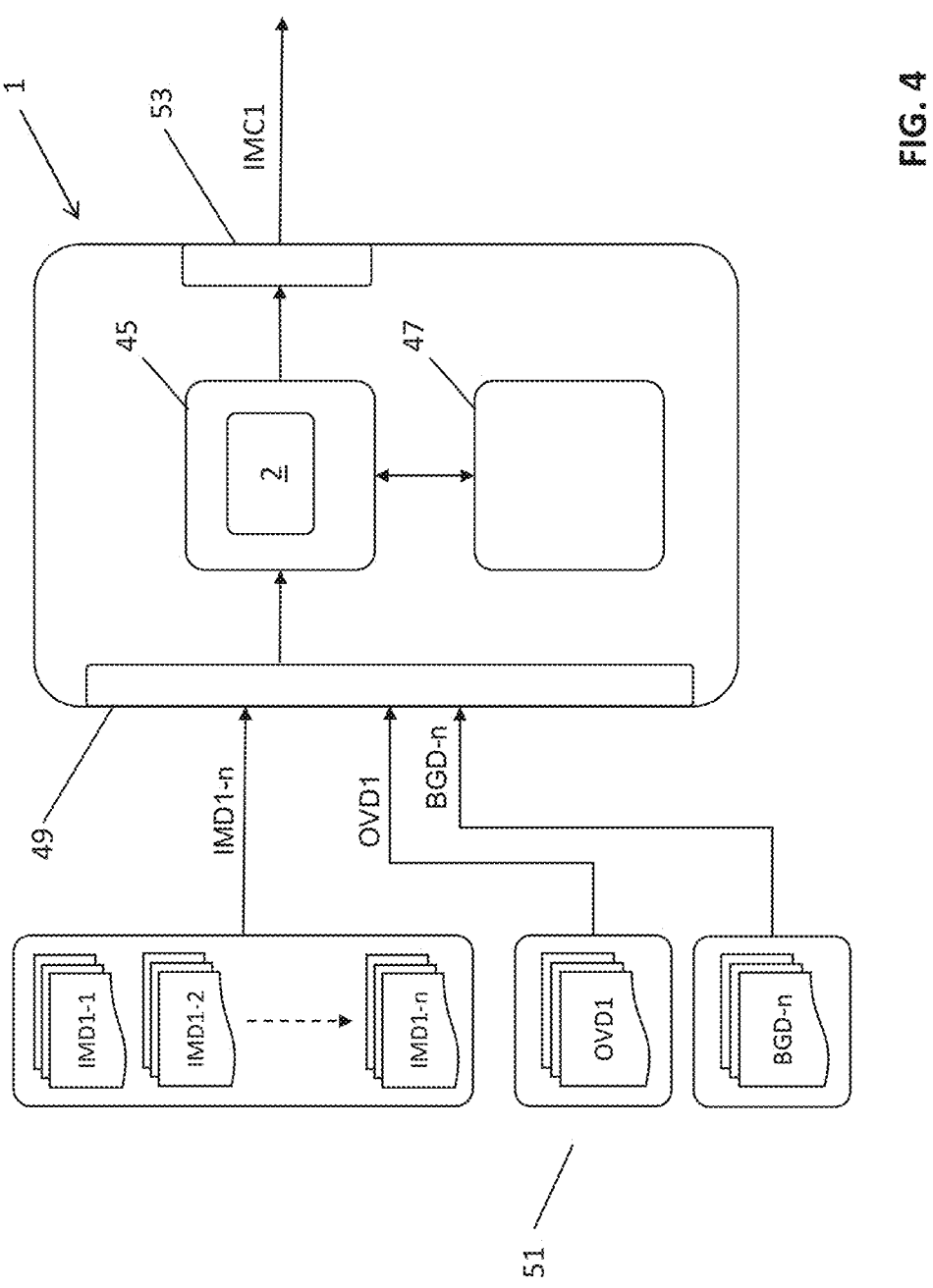
FIG. 4 shows a schematic representation of an image processing system shown in FIG. 1.

The first and second image semantic areas IMS-1, IMS-2 correspond to the background area BG1 and the foreground area FG1 respectively of the first image IMG1-$n$. Each pixel is classified as representing the background area BG1 or the foreground area FG1 of the first image IMG1-$n$ in dependence on the determined probability, for example with reference to a probability threshold. A class is assigned to each pixel in the first image IMG1-$n$ to identify the pixel as occurring in the foreground area FG1 or the background area BG1. The pixels identified as belonging to the first class are disposed in the first image semantic area IMS-1; and the pixels identified as belonging to the second class are disposed in the second image semantic area IMS-1. The first image semantic areas IMS-1 form at least one foreground image area IMOF-1; and the second image semantic areas IMS-2 form at least one background image area IMOB-1. The segmentation model 2 generates a key image IMK1-$n$ defining the at least one foreground image area IMOF-1 and/or the at least one background image area IMOB-1. The segmentation model 2 facilitates determination of the or each area of interest in the first image IMG1-$n$. The first image semantic areas IMS-n are used to generate a key image IMK-1. The colour of each pixel in the key image IMK-1 denotes the different class determined in a corresponding pixel in the first IMG1-$n$. For example, white may be used to indicate a background of the first image, and black may be used to indicate a foreground of the first image. It will be understood that other colours may be used to differentiate between the first image semantic areas IMS-1. The first image IMG1-$n$ and the corresponding key image IMK-1 are shown in FIG. 3.

The first image IMG1-$n$ may be a video image, for example for transmission as a television video image. The image processing system 1 is configured also to implement a content replacement system 3 operable dynamically to replace a portion of the first image IMG1-$n$. The image processing system 1 may, for example, be used to replace original content 4 displayed on an advertising board 5 in a stadium 6, as shown in FIG. 3. Alternatively, or in addition, the image processing system 1 may apply a graphical image to the advertising board 5 in a stadium 6. The term "advertising board" used herein may refer to one or more of the following: a billboard, an advertising hoarding, a banner or other surface used to display advertising or other forms of visible communication messages or graphics. The advertising board 5 may display static or dynamic images (such as motion). The advertising board may be active or passive.

As described herein, the content replacement system 3 may replace one or more foreground image area IMOF-1 and/or one or more background image area IMOB-1 determined by the segmentation model 2. The semantic areas IMS-n may be used as a mask for application of an overlay to replace or modify a portion of the first image IMG1-$n$. The mask may, for example, define the key image IMK1-$n$ (described herein with reference to FIG. 7). The content replacement system 3 in the present embodiment is configured to perform the photo-realistic replacement of an advertising board 5 occurring in the first image IMG1-$n$. The image processing system 1 is operative to segment the first image IMG1-$n$ to determine at least one background image area IMOB-1 representing the advertising board 5.

FIG. 1 is a schematic overview of an example broadcasting system 7 in which the present embodiment is applicable. An image capture system 9 captures the first image IMG1-$n$.

The image processing system 1 to segment the first image IMG1-$n$. The image semantic areas IMS-n collectively form one or more foreground image area IMOF-1 and/or one or more background image area IMOB-1. One or more foreground image area IMOF-1 and/or one or more background image area IMOB-1 may be replaced or overlaid with alternate image data. The alternate image data in the present embodiment is an overlay image represented by overlay image data OVD1. The modified first image IMG1-$n$ is then output. It will be appreciated that the television broadcasting system of FIG. 1 has been simplified for ease of explanation and that other configurations will be available to persons skilled in the art.

Image Capture

Figure 2:
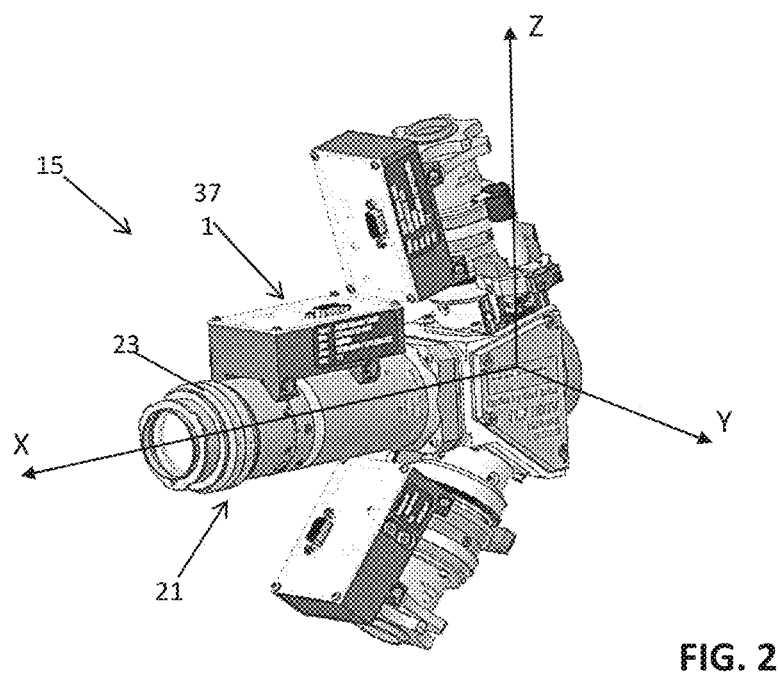
FIG. 2 shows an image capture device incorporating a non-visible electromagnetic radiation imaging device for generating target segmentation data for training a segmentation model.

The image capture system 9 comprise at least one first imaging device 15 for capturing a source image. The or each first imaging device 15 is configured to output source (raw) image data representing the source image. As shown in FIGS. 1 and 2, the or each first imaging device 15 comprises a camera. In the present embodiment the or each first imaging device 15 is a visible electromagnetic radiation imaging device configured to capture visible electromagnetic radiation, i.e., electromagnetic radiation that is perceived by the human eye. The first imaging device 15 is configured to capture electromagnetic radiation in the range 400 to 700 nanometres. The first imaging device 15 has a first field of view FOV1. The source image at least substantially corresponds to the first field of view FOV1 of the first imaging device 15. The first imaging device 15 is rotatable about one or more axis, for example about a longitudinal axis X, a transverse axis Y and/or a vertical axis Z. Rotation of the first imaging device 15 about the one or more axes can provide one or more of the following motions: pan (P), tilt (T) and roll (R). The first imaging device 15 may have a fixed location or may be movable (for example on a trackway) or may be mobile (for example a hand-held camera or a gyroscopic stabilised camera). One or more sensors (denoted generally by the reference numeral 19) may be provided to aid determination of the angular orientation of the first imaging device 15. The sensors 19 may comprise a gyroscope or an accelerometer, for example. Alternatively, or in addition, the sensors 19 may comprise a rotary encoder for determining the angular position one a respect axis. The first imaging device 15 may have a fixed lens or a zoom lens. The first imaging device 15 in the present embodiment comprises a zoom lens 21 which provides an optical zoom selectively to increase and decrease the apparent distance to an object. A zoom sensor 23 may be provided to determine a current magnification level of the zoom lens 21. Alternatively, or in addition, a digital zoom function may be implemented. The sensors 19 and the zoom sensor 23 may collectively be referred to as pan, tilt and zoom (PTZ) sensors.

The first image IMG1-$n$ is represented by a first image data IMD1-$n$. The first image data IMD1-$n$ is extracted from the source image data output from the or each first imaging device 15. The first image IMG1-$n$ represents a first scene SC1. The first image IMG1-$n$ may represent the complete source image captured by the first imaging device 15. The first scene SC1 represented by the first image IMG1-$n$ may at least substantially correspond to the first field of view FOV1 of the first imaging device 15. Alternatively, the first image IMG1-$n$ may be a portion (or a sub-set) of a source image. The first image IMG1-$n$ may represent a portion of the source image captured by the first imaging device 15. The first scene SC1 represented by the first image IMG1-$n$ may represent only a sub-set of the first field of view FOV1 of the first imaging device 15. The first image IMG1-*n* comprises a first foreground area FG1 and a first background area BG1. The first foreground area FG1 represents the part of the first image IMG1-*n* which is closer to the focal plane in the captured scene. The first background area BG1 represents the part of the first image IMG1-*n* farther from the focal plane in the captured scene. By way of example, the first foreground area FG1 may comprise one or more players in a game; and the first background area BG1 may comprise or consist of the ground, the pitch, the advertising board 5 or an area behind the player(s). One or more subjects of interest (denoted generally by the reference numeral 25) may be occurring in the first image IMG1-*n*. The subject of interest 25-*n* may be in the first foreground area FG1 or the first background area BG1. The one or more subjects of interest 25-*n* may, for example, comprise or consist of a person (such as a player) or another feature. It will be understood that the first foreground area FG1 and the first background area BG1 may comprise other image features.

The first image IMG1-*n* may at least substantially correspond to the source image captured by the first imaging device 15. Alternatively, the first image IMG1-*n* may be a portion (or a sub-set) of the source image captured by the first imaging device 15. The first image IMG1-*n* may be defined within the source image, for example by defining one or more of the following: size, geometry and location. The first image IMG1-*n* may be defined by a first set of coordinates. The first image IMG1-*n* may correspond to a region of interest in the source image. The location of the first image IMG1-*n* within the source image may change to track the region of interest, for example in dependence on changes in the position and/or orientation of the first imaging device 15. The location of the first image IMG1-*n* within the source image may be determined in dependence on the sensors 19 and/or the zoom sensor 23.

Alternatively, or in addition, the first image IMG1-*n* may change due to changes in the relative positions of the one or more subjects of interest 25-*n*. The one or more subjects of interest 25-*n* may move into or out of the field of view FOV1 of the first imaging device 15. The subject of interest 25-*n* may, for example, comprise or consist of an advertising board 5. At least a portion of the subject of interest 25-*n* may become obscured in the field of view FOV1 of the first imaging device 15 by an intervening object, such as a ball, a person or a player. The subject of interest 25-*n* may be only partially observed in the first image IMG1-*n*. The subject of interest 25-*n* may be obscured, wholly or partially, by the intervening object. The intervening object may, for example, be a player. The subject of interest 25-*n* may be partially observed and partially obscured. Accurately determining the position and profile of the or each subject of interest 25-*n* enables coherent augmentation of the first image IMG1-*n* with supplementary image data.

In the present embodiment, the advertising board 5 is a first subject of interest 25-1; and the player is a second subject of interest 25-2. The advertising board 5 is disposed in the first background area BG1 and the player is disposed in the first foreground area FG1. The advertising board 5 may optionally carry original content 27, such as an advertisement. The advertising board 5 and the original content 27 are provided to be seen by persons in the vicinity. A plurality of the advertising boards 5 may be provided at a sporting stadium or arena (denoted generally by the reference numeral 6) visible to spectators present at the event, as illustrated in FIG. 3. The advertising boards 5 may, for example, be arranged around a perimeter of a playing area or a playing field (denoted generally by the reference numeral 31). The playing area 31 represents the area officially marked off for playing a game. By way of example, the playing area 31 may comprise a pitch marked off for playing a ball game, such as football, soccer or rugby; a court marked off for playing a ball game, such as tennis, handball or basketball; or a rink marked off for curling or ice hockey. The advertising boards 5 may be arranged around the perimeter of the playing area 31 so as to be prominent to spectators in the sporting stadium 6. The geometry or configuration of a particular sporting stadium 6 is generally invariant, i.e., substantially constant or unchanging. As described herein, the geometry or configuration of the sporting stadium 6 may be defined in a background composition data set BGD-n defining known features or characteristics.

Target Segmentation

The image capture system 9 in the present embodiment comprises at least one second imaging device 37 configured to detect the non-visible electromagnetic radiation emitted by the emitters 41 disposed in the or each advertising board 5. In the present embodiment the or each second imaging device 37 is a non-visible electromagnetic radiation imaging device configured to capture non-visible electromagnetic radiation, i.e., electromagnetic radiation that cannot be perceived by the human eye.

The or each advertising board 5 in the present embodiment is active and comprises a plurality of emitters 41 for emitting electromagnetic radiation. The emitters 41 may, for example, comprise light emitting diodes (LEDs) for emitting visible electromagnetic radiation. The emitters 41 may be controlled to display the source advertising material. Alternatively, or in addition, the emitters 41 may be configured to emit non-visible electromagnetic radiation, such as infrared or near infrared light, for detection by the second imaging device 37. In the present embodiment, the emitters 41 emit non-visible electromagnetic radiation. In a variant, the or each advertising board 5 may be passive, for example comprising a filter or an absorber. The filter may be provided on the advertising board 5 to permit transmission or emission of visible or non-visible electromagnetic radiation at an identifiable frequency (or within an identifiable frequency range). A film or coating may be provided on the or each advertising board 5 to promote the reflection, emission or transmission of non-visible electromagnetic radiation. The non-visible electromagnetic radiation is identifiable to enable determination of the visible part(s) of the or each advertising board 5 (i.e. the part(s) of the or each advertising board 5 which is not obfuscated). The non-visible electromagnetic radiation may, for example, be emitted at a known frequency (or in a known frequency range) to enable determination of the position and/or profile of the or each advertising board 5.

The at least one second imaging device 37 outputs segmentation image data IMD2-*n* representing the detected non-visible electromagnetic radiation. The segmentation image data IMD2-*n* is used to generate target segmentation data SGDT-n which defines a target (i.e. desired) segmentation of the first image IMG1-*n*. The target segmentation data SGDT-n is used to train the segmentation model 2 to differentiate between the foreground area FG1 and the background area BG1 of the first image IMG1-*n*.

Supplementary Data

A background composition data set BGD-n may be provided to facilitate segmentation of the first image IMG1-*n* by the segmentation model 2. The background composition data may, for example, define a composition of at least a portion of the background of the image represented by the image data. The background composition data set BGD-n represents a priori information, i.e., information that was already known. The background composition data set BGD-n may define features or properties of the background area BG1 of the first image IMG1-$n$, but is not limited in this respect. For example, the background composition data set BGD-n may define a geometry of the first scene SC1 represented by the first image IMG1-$n$. The background composition data set BGD-n optionally defines the geometry of at least a portion of the sporting stadium 6 and/or the playing area 31. The geometry or configuration of a particular playing area 31 is generally invariant, i.e., substantially fixed or unchanging. As such, the background composition data set BGD-n may be invariant. Alternatively, or in addition, the background composition data set BGD-n may optionally define the geometry of the advertising board 5, for example defining the size and/or profile of the advertising board 5 when viewed from different camera angles. Alternatively, or in addition, the background composition data set BGD-n may define a spatial location and/or orientation of the or each first imaging device 15. The background composition data set BGD-n may, for example, define the spatial location of the or each first imaging device 15 relative to the playing area 31 and/or the or each advertising board 5. In certain embodiments, the background composition data set BGD-n may be generated automatically by analysis of the first image data IMG1-$n$. For example, the first image data IMG1-$n$ may be processed to determine background features which have shapes and/or profiles which at least substantially fixed. The background composition data set BGD-n may be generated in dependence on the identification of such background features. The resulting background composition data set BGD-n may be used by the segmentation model 2 when segmenting the first image IMG1-$n$.

The background composition data set BGD-n in the present embodiment is used as calibration information for the image processing system 1. The background composition data set BGD-n defines the locations of the or each advertising board 5, for example in a stadium or a background panorama.

Image Processing

Figure 5:
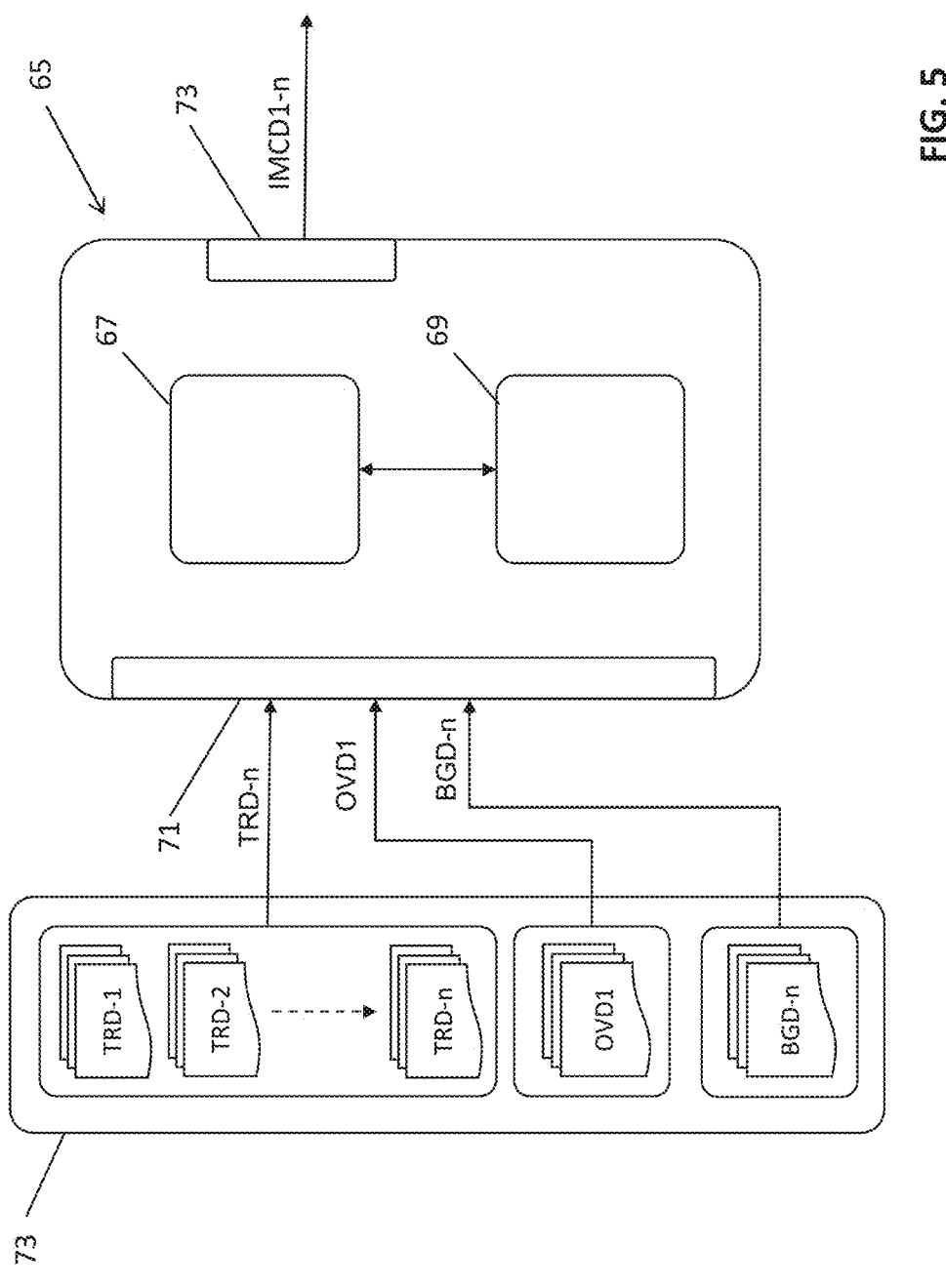
FIG. 5 shows a schematic representation of a machine learning training system for training the segmentation model.

The image processing system 1 is implemented by one or more computational devices. The image processing system 1 is configured to replace image content in the first image IMG1-$n$. As shown in FIG. 5, the image processing system 1 comprises at least one first electronic processor 45 and a first memory device 47. The at least one first electronic processor 45 in the present embodiment is configured to process the first image IMG1-$n$. In the present embodiment, the at least one electronic processor 45 is configured to process the first images IMG1-$n$ at least substantially in real time. This facilitates processing of the video images received from the first imaging device 15 for transmission at least substantially in real time. The at least one first electronic processor 45 comprises at least one first electrical input 49 for receiving the first image data IMD1-$n$ from the first imaging device 15. The first image data IMD1-$n$ may optionally be stored in the first memory device 47. In the present embodiment, the segmentation model 2 is integrated into the image processing system 1. In particular, the at least one first electronic processor 45 is configured to execute the segmentation model 2 to segment the first image IMG1-$n$ into a plurality of image semantic areas IMS-n. The operation of the image processing system 1 will now be described.

The at least one first electronic processor 45 receives the first image data IMD1-$n$. The first electronic processor 45 is configured to execute the segmentation model 2 to segment the first image IMG1-$n$ into a plurality of image semantic areas IMS-n. The image semantic areas IMS-n comprise one or more foreground image area IMOF-1 and/or one or more background image area IMOB-1. The segmentation model 2 generates the key image IMK1-$n$ which corresponds to the first image IMG1, as shown in FIG. 3 by way of example.

The key image IMK1-$n$ can be used as a mask for overlaying the overlay image data OVD1 to the first image IMG1-$n$. For example, the overlay image data OVD1 can be overlaid onto the first image IMG1-$n$ on those locations where the key image IMK1-$n$ is white and is not applied on the locations where the key image IMK1-$n$ is black. The overlay image data OVD1 is overlayed onto the masked portion of the first image data IMD1-$n$ corresponding to the advertising board 5. If a pixel in the key image IMK1-$n$ is gray, a mixture of the first image IMG1-$n$ and the virtual overlay image IMG2-$n$ in proportion to the brightness of the pixel. This process requires that segmentation data is available to generate the key image IMK1-$n$. One approach for generating the key image IMK1-$n$ is to incorporate a plurality of emitters 41 into the advertising board 5. The emitters 41 are configured to emit electromagnetic radiation that is capable of being detected by the second imaging device 37 to generate the segmentation image IMG2-$n$. The emitters 41 may emit non-visible electromagnetic radiation, for example comprising or consisting of electromagnetic radiation in the infra-red spectrum. In a variant, the emitters 41 may emit visible electromagnetic radiation, for example at a predetermined frequency and/or at predetermined time intervals. It would be advantageous to be able to segment the first image IMG1-$n$ to determine a background image area IMOB-1 corresponding to the advertising board 5 without requiring the segmentation image IMG2-$n$.

Composite Image

The at least one first electronic processor 45 is configured to overlay first supplementary image data SIMD1 onto the first image IMG1-$n$. The at least one first electronic processor 45 reads the first supplementary image data from the storage device 51. The first supplementary image data SMD1 comprises or consists of a set of the overlay image data OVD1. The overlay image data OVD1 comprises image data which is applied as an overlay on the first image data IMD1-$n$ to generate the first composite image IMC1. The overlay image data OVD1 may comprise advertising material, for example comprising one or more of the following: text, graphics, a logo, an emblem and an image. The at least one first electronic processor 45 is configured to form a first composite image IMC1-$n$ in dependence on the first image data IMD1-$n$ and the overlay image data OVD1. The at least one first electronic processor 45 applies the overlay image data OVD1 onto a masked portion of the first image data IMD1-$n$. The masked portion of the first image data IMD1-$n$ corresponds to one of more of the semantic areas IMS-n segmented from the first image IMG1-$n$. The at least one first electronic processor 45 comprises at least one electrical output 53 for outputting first composite image data IMCD1-$n$ representing the first composite image IMC1-$n$.

The segmentation model 2 described herein is configured to segment the first image IMG1-$n$ to identify semantic areas. One or more of the identified semantic areas can be used to generate a mask for the applying the overlay image data OVD1 to form the first composite image IMC1-$n$. The segmentation model 2 may be configured to identify a semantic area corresponding to an advertising board 5 in the first image IMG1-$n$. However, the segmentation model 2 is not limited to segmenting the first image IMG1-$n$ to identify a semantic area IMS-n corresponding to an advertising board 5. The segmentation model 2 may identify semantic areas corresponding to other features or regions of the first image IMG1-*n*. Furthermore, the overlay image data OVD1 may be applied to the first image IMG1-*n* in regions other than an advertising board 5. The overlay image data OVD1 may be applied to a surface or a region of the first image IMG1-*n*. The overlay image data OVD1 may, for example, be applied as an overlay to one of more of the following features identified in the first image IMG1: an advertising board, a static sign, a light emitting diode (LED) board (either static or animated), a playing area (or a region adjacent to the playing area), a playing field or pitch, an out-of-bounds area, an area of grass, and a substantially flat (planar) surface. This list of features is not exhaustive and the overlay image data OVD1 may be applied as an overlay to other features of the first image IMG1-*n*. The overlay image data OVD1 may comprise replacement content and/or placement of new content.

The first composite image IMC1 may be broadcast live and/or may be recorded for transmission later. The first composite image IMC1 may be distributed in any suitable form including, for example, terrestrial, cable, satellite or Internet delivery mechanisms to any suitable media playback device including, for example, televisions, computers or hand-held devices. The first composite image IMC1 may be output to multiple viewers simultaneously, or may be transmitted to users individually, for example as video on demand.

Segmentation Model Training

The segmentation model 2 implements an artificial neural network to segment the first image IMG1-*n*. The segmentation model 2 is trained in dependence on target segmentation data SGDT-n obtained by processing the segmentation image data IMD2-*n*. The training of the segmentation model 2 is performed independently of the image processing system 1. The training process will now be described in more detail.

The target segmentation data SGDT-n defines a target (i.e. desired) segmentation of the first image IMG1-*n* which can be used to provide supervised learning of the segmentation model 2. In this embodiment, the target segmentation data SGDT-n is used as a set of ground-truth data for training the segmentation model 2. A training algorithm is executed to assess the segmentation obtained by application of the segmentation model 2. The training algorithm implements an error function (loss function) to determine an error. The training algorithm may determine an error magnitude, for example. The error function is operative to compare the segmentation derived from the segmentation model 2 to the target segmentation defined by the target segmentation data SGDT-n. A training output is generated in dependence on the determined error. The training output may represent the determined error. The segmentation model is updated in dependence on the determined first error. The training algorithm modifies the parameters of the segmentation model 2 iteratively to reduce the error. The training algorithm in the present embodiment uses backpropagation (backward propagation of errors) to determine a gradient of a loss function with respect to each of a plurality of weights (operators) defined in the artificial neural network. The training algorithm applies a gradient descent algorithm to modify one or more of the weights to find a local minimum of the function. The gradient is multi-dimensional, and the weights are adjusted to reduce the overall error. A neural network optimizer is implemented to select an appropriate path to reduce the error. The neural network optimizer may, for example, be the Stochastic Gradient Descent (SGD) optimizer, the Adam optimizer, or the RANGER optimizer.

At least in certain embodiments, the training algorithm may iteratively improve the segmentation achieved by the segmentation model 2. At least in certain embodiments, the image processing system 1 is operative to apply the segmentation model 2 to segment a first image IMG1-*n* to determine one or more subjects of interest 25-*n* without requiring the segmentation image IMG2-*n*. The segmentation model 2 is trained to segment the first image IMG1-*n* to classify the semantic areas corresponding to the foreground area FG1 and the background area BG1.

The segmentation model 2 is trained using machine learning techniques implemented by one or more computational devices. The machine learning techniques are applied to a plurality of training data sets TRD-n. The segmentation model 2 comprises a plurality of weights which are adjusted iteratively to reduce an error determined in respect of each training data set TRD-n. A gradient descent algorithm is implemented to reduce the overall error. In the present embodiment, a training system 65 is used to train the segmentation model 2. The training system 65 executes a machine learning algorithm to train the segmentation model 2. The training system 65 is implemented on one or more computer and will now be described in more detail.

Training Data

Figure 6:
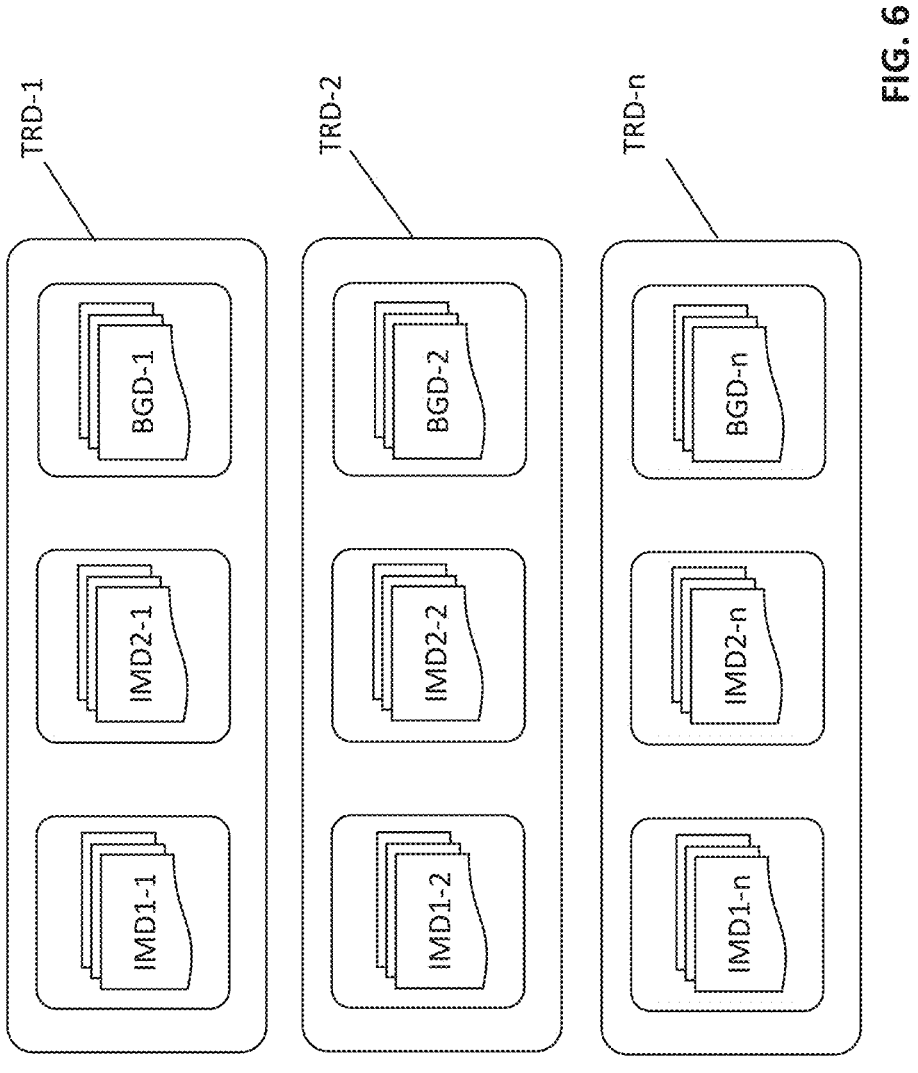
FIG. 6 shows a schematic representation of the training data sets used by the machine learning training system shown in FIG. 5.

The training data sets TRD-n are represented schematically in FIGS. 5 and 6. In the present embodiment, the training data sets TRD-n each comprise the first image data IMD1-*n* captured by the first imaging device 15. The first image data IMD1-*n* is packaged into a plurality of training data sets TRD-n. The respective training data sets TRD-n are determined herein by the suffix "-n", wherein "n" is a whole number integer. The background composition data set BGD-n may optionally be incorporated into the respective training data sets TRD-n. Alternatively, the background composition data set BGD-n may be stored independently of the training data sets TRD-n.

As outlined above, the image capture system 9 comprises at least one second imaging device 37 configured to detect non-visible electromagnetic radiation. The or each second imaging device 37 is associated with one of the first imaging devices 15. In the present embodiment, the second imaging device 37 is fixedly mounted to the first imaging device 15. The first and second imaging devices 15, 37 are at least substantially aligned with each other and have at least substantially the same field of view. The at least one second imaging device 37 is offset from the first imaging device 15 and non-visible electromagnetic radiation is directed to the or each second imaging device 37. A prism (not shown) or other optical element may direct the non-visible electromagnetic radiation to the at least one second imaging device 37. The or each second imaging device 37 is a non-visible electromagnetic radiation imaging device configured to capture non-visible electromagnetic radiation, i.e., electromagnetic radiation having a wavelength in a spectrum not visible to the human eye. The or each second imaging device 37 may be configured to capture electromagnetic radiation having a wavelength longer than that of visible electromagnetic radiation. The image capture system 9 may comprise two or more second imaging devices 37 configured to capture non-visible electromagnetic radiation at different wavelengths. For example, a first one of the second imaging devices 37 may capture non-visible electromagnetic radiation at a first wavelength; and a second one of the second imaging devices 37 may capture non-visible electromagnetic radiation at a second wavelength which is different from the first wavelength. The or each second imaging device 37 may be configured to capture electromagnetic radiation in the near-infrared spectrum (having a wavelength in the range 750 nm to 1400 nm) or infrared spectrum.

The or each second imaging device 37 is operative to output segmentation image data IMD2-$n$ representing a segmentation image IMG2-$n$. The segmentation image IMG2-$n$ represents the non-visible electromagnetic radiation emitted from the emitters 41 in the or each advertising board 5 and detected by the second imaging device 37. The second imaging device 37 detects the non-visible electromagnetic radiation emitted by the emitters 41 in respect of the visible (i.e. non-obfuscated) parts of the or each advertising board 5. The second imaging device 37 does not detect the non-visible electromagnetic radiation emitted by the emitters 41 in respect of the non-visible (i.e. obfuscated) parts of the or each advertising board 5. The segmentation image data IMD2-$n$ in the present embodiment is used to train the segmentation model 2. In particular, the segmentation image data IMD2-$n$ is processed to generate a set of target segmentation data SGDT-n. The target segmentation data SGDT-n represents a target (objective) segmentation for the first image IMG1-$n$ (shown schematically in FIG. 6). The target segmentation data SGDT-n differentiates between the first foreground area FG1 and the first background area BG1 within the first image IMG1-$n$. The segmentation image data IMD2-$n$ is captured concurrently with the first image data IMG1-$n$. The target segmentation data SGDT-n may be generated at least substantially in real time. Alternatively, the target segmentation data SGDT-n may be generated offline (i.e., not in real time). A timestamp may be applied to the target segmentation data SGDT-n and/or the first image data IMG1-$n$. The timestamp may be used to facilitate processing of the first image data IMG1-$n$. The target segmentation data SGDT-n is used as a ground-truth for training the segmentation model 2 to segment the first image IMG1-$n$. The target segmentation data SGDT-n represents the objective (i.e. goal) for the segmentation model 2. Once training of the segmentation model 2 is complete, the segmentation of the first image IMG1-$n$ may be performed without the segmentation image data IMD2-$n$. Thus, the image processing system 1 and the content replacement system 3 may be implemented without the at least one second imaging device 37. It will be understood that the segmentation model 2 may be updated dynamically, for example as new image data IMD1-$n$ and/or target segmentation data SGDT-n becomes available.

As illustrated in FIGS. 5 and 6, the segmentation image data IMD2-$n$ (and/or the target segmentation data SGDT-n) is packaged into the training data sets TRD-n with the corresponding or related first image data IMD1-$n$. The target segmentation data SGDT-n is generated in dependence on the segmentation image data IMD2-$n$ captured by the second imaging device 37. The target segmentation data SGDT-n correlates directly to the first image data IMD1-$n$ captured by the first imaging device 15. A transform may be applied to match the target segmentation data SGDT-n to the first image data IMD1-$n$ if there is no direct correlation, for example due to a spatial and/or angular offset, or different fields of view of the first and second imaging devices 15, 37. In use, the first and second imaging devices 15, 37 rotate and/or translate in unison. The first image data IMD1-$n$ and the first segmentation image data IMD2-$n$ at least substantially correspond to the same scene SC1. The training data sets TRD-n may optionally comprise camera tracking data to indicate the position and/or orientation of the first imaging device 15. Alternatively, or in addition, the training data sets TRD-n may comprise zoom data indicating a zoom function of the first imaging device 15.

Figure 7:
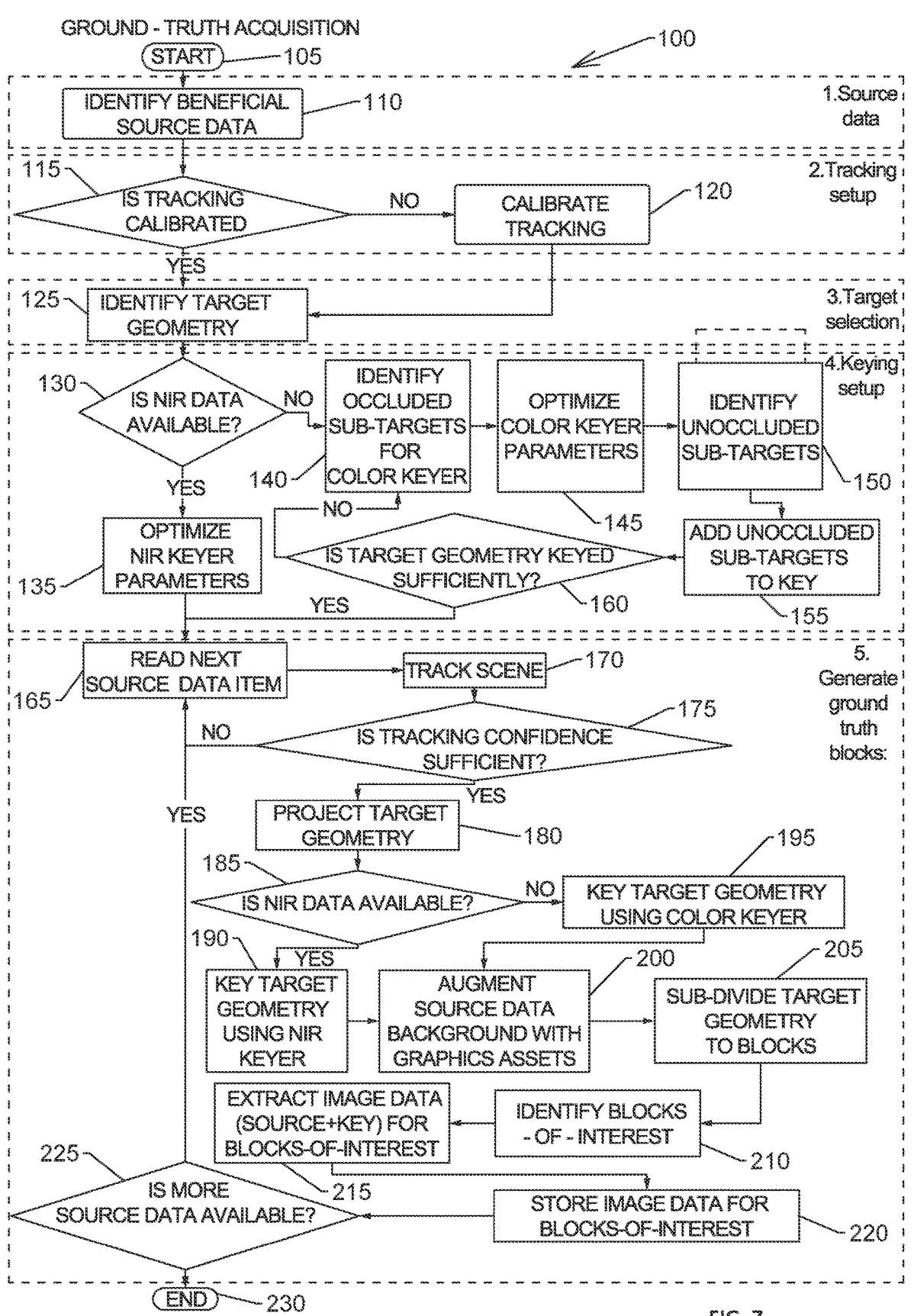
FIG. 7 shows a first block diagram representing the acquisition of data for training.

As shown in FIG. 5, the training system 65 comprises at least one first electronic processor 67 and a second memory device 69. The at least one second electronic processor 67 in the present embodiment is configured to process the training data sets TRD-n. The at least one second electronic processor 67 comprises at least one electrical input 71 for receiving the training data sets TRD-n. The training data sets TRD-n may be stored in the second memory device 69 or, as shown in FIG. 6, on a separate storage device 73. The at least one second electronic processor 67 accesses the first image data IMD1-$n$ and, if available, the segmentation image data IMD2-$n$ in the respective training data sets TRD-n. As shown in FIG. 7, each training data set TRD-n comprises the first image data IMD1-$n$ and a related segmentation image data IMD2-$n$. The training data sets TRD-n may optionally comprise a set of background composition data BGD-n providing additional information in relation to the background content of the first image IMG1 represented by the first image data IMD1.

The segmentation image data IMD2-$n$ is processed to generate the target segmentation data SGDT-n. In the present embodiment, the segmentation image data IMD2-$n$ is processed to determine the advertising board 5 in the segmentation image IMG2-$n$. Each pixel in the segmentation image IMG2-$n$ is classified as either corresponding to the advertising board 5 or not corresponding to the advertising board 5. The target segmentation data SGDT-n identifies the position of the or each pixel classified as corresponding to the advertising board 5.

A keying algorithm is applied to the segmentation image data IMD2-$n$ to generate the target segmentation data SGDT-n. The keying algorithm may apply one or more keying parameters, such as a brightness threshold, to generate the target segmentation data SGDT-n. The brightness threshold may be predefined or may be determined dynamically, for example in dependence on an average brightness of the segmentation image IMG2-$n$. The keying algorithm classifies pixels having a brightness greater than the brightness threshold as corresponding to the advertising board 5. The keying algorithm classifies pixels having a brightness less than the brightness threshold as corresponding to features other than the advertising board 5. The regions outside of the projected perimeter of the LED advertising board model are made black in the key image IMK1-$n$. The areas within the key image IMK1-$n$ corresponding to the advertising board 5 are rendered white and the remainder of the key image is rendered black. It will be understood that the key image IMK1-$n$ may comprise colours other than black and white. More than two colours may be applied to represent additional classes. Alternatively, or in addition, the keying algorithm may use other techniques to classify the pixels.

Figure 8A:
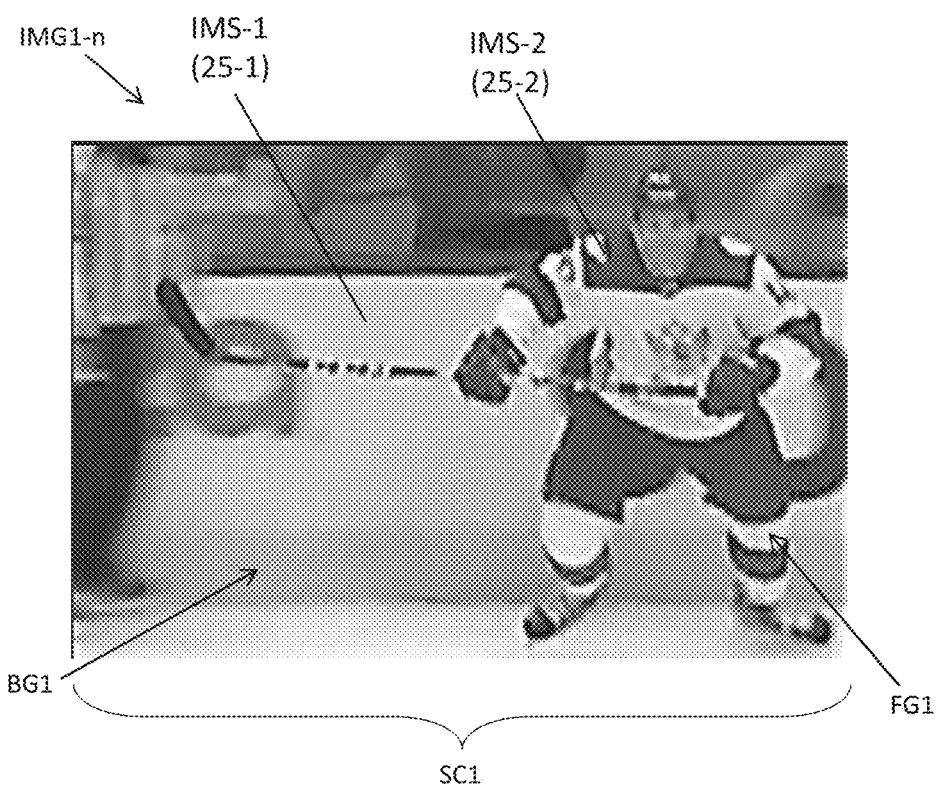
FIG. 8A shows a first image captured by a first imaging device.
Figure 8B:
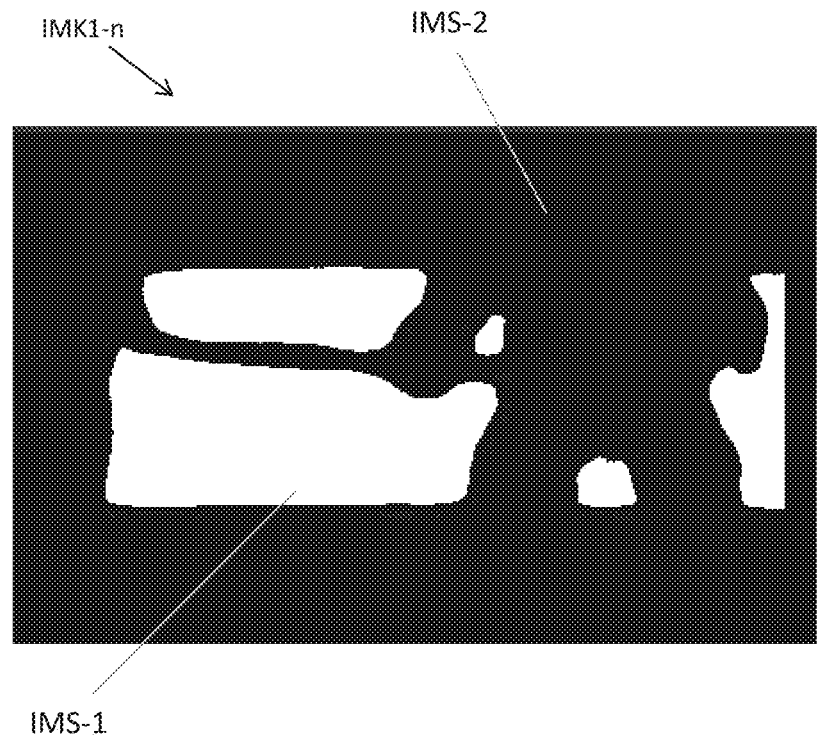
FIG. 8B shows a key image generated by processing a second image captured by a second imaging device.

The target segmentation data SGDT-n comprises a key image IMK1-$n$ (or mask) representing the geometry of the advertising board 5. The key image IMK1 representing target segmentation data SGDT-n derived for the first image IMG1 is shown in FIG. 8B. The first image IMG1-$n$ and the or each segmentation image IMG2-$n$ are aligned with each other to enable direct application of the key image IMK1-$n$ to the first image IMG1-$n$. The key image IMK1-$n$ represents the semantic area corresponding to the geometry of the advertising board 5 and can be used as a mask for overlaying the overlay image data OVD1. The key image IMK1-$n$ in the present embodiment is a black and white image.

The training process is performed in respect of a plurality of training data sets TRD-n. The training data sets TRD-n each comprise first image data IMD1-$n$ and segmentation image data IMD2-$n$. The first image data IMD1-$n$ and the segmentation image data IMD2-$n$ are captured at least substantially concurrently (i.e., at least substantially at the same time) and relate to the same scene SC1. As outlined above, the segmentation image data IMD2-$n$ is processed to generate the target segmentation data SGDT-n. Independently of the target segmentation data SGDT-n, the segmentation model 2 processes the first image data IMD1-$n$ to generate candidate segmentation data SGDC-n. The candidate segmentation data SGDC-n represents a candidate segmentation of the first image IMG1-$n$. The training algorithm compares the candidate segmentation data SGDC-n and the target segmentation data SGDT-n in respect of each training data set TRD-n. An error is calculated in dependence on the comparison. The segmentation model 2 is updated in dependence on the analysis of each training data set. A learning algorithm determines an error in respect of the analysis of the training data set TRD-n performed by the segmentation model 2. The learning algorithm updates the segmentation model 2 to reduce the determined error. Updating the segmentation model 2 comprises modifying a weight of one or more model parameters which determine the operation of the segmentation model 2. The training process is then repeated using the updated segmentation model 2 to analyse another training data set. This process is repeated until the segmentation model 2 achieves a suitable degree of accuracy in segmenting images IMG1-$n$. The training process is described with respect to a first training data set TRD-1. A first image IMG1-1 is shown in FIG. 8A by way of example. The key image IMK1-1 corresponding to the first image IMG1-1 is shown in FIG. 8B. The key image IMK1-1 is derived from the segmentation image IMG2-$n$ captured at the same time as the first image IMG1-1. The key image IMK1-1 represents the target segmentation data SGDT-n in this example.

Training Procedure

The training of the segmentation model 2 will now be described with reference to a first flow diagram 100 shown in FIG. 7.

The training process is started (BLOCK 105). The training process comprising identifying one or more sets of source data (BLOCK 110). The or each set of source data is in the form of a first training data set TRD-1 comprising: first image data IMD1-1 captured by the first imaging device 15; and first segmentation image data IMD2-1 captured by the second imaging device 37. A first training data set TRD-1 is determined comprising a first set of the first image data IMD1-1 and a first set of the first segmentation image data IMD2-1. The first training data set TRD-1 may optionally comprise tracking information, for example comprising a camera angle of the first imaging device 15 (defining an orientation about one or more of the X, Y and Z axis); and/or a zoom factor of the first imaging device 15 (defining a zoom magnification of the zoom lens 21). The tracking information may facilitate matching the generated data to the scene SC1. It will be understood that the tracking information may also be applied to the second imaging device 37 which is at least substantially aligned with the first imaging device 15.

A check is performed to determine if the source data is calibrated (BLOCK 115). If the source data is not calibrated, the training process comprises calibrating the source data (BLOCK 120). The calibration process may, for example, comprise applying a transform to align the first image data IMD1-1 and the first segmentation image data IMD2-1. A target geometry is determined within the calibrated source data (BLOCK 125). The target geometry refers to areas where the training data is used/collected. The target geometry is typically selected in areas determined as facilitating keying of the occlusions. For example, where the segmentation image data IMD2-$n$ is available, the target geometry may be selected where it contains a useful signal, such as at least a portion of the advertising board 5. Alternatively, or in addition, the target geometry may be selected in areas in which accurate processing of the first image data IMD1-$n$ may be performed using an image separation algorithm. The image separation algorithm may comprise or consist of a chroma-keying algorithm which segments the first image IMG1-$n$ based on colour. As described herein, the image separation algorithm may comprise one or more separation parameters which determine the segmentation the first image IMG1-$n$. The one or more separation parameters may be fixed (i.e., invariant). Alternatively, or in addition, one or more of the separation parameter may be variable. For example, one or more separation parameters may be dynamically adjusted. Typical target geometries in a football game may, for example, comprise a region comprising an advertising board 5 having emitters 41 for emitting non-visible electromagnetic radiation. The target geometry may correspond to the complete first image IMG1-$n$ represented by the first image data IMD1-1. Alternatively, the target geometry may be a sub-section of the first image IMG1-$n$. A first subset of the first image data IMD1-1 may be selected, the first sub-set corresponding to the determined target geometry in the first image IMG1-$n$. The target geometry in the present embodiment may, for example, be a geometry comprising at least one said advertising board 5. Alternatively, the target geometry may be a geometry which does not include one said advertising board 5. For example, the target geometry may consist exclusively of the foreground area FG1 or the background area BG1. The target geometry is determined within the or each set of the source data. The identification of the target geometry may be performed manually, for example by an operator. Alternatively, the identification of the target geometry may be performed automatically. The target geometry may be determined within the first image data IMD1-1 and the first segmentation image data IMD2-1. A second subset may be selected from the first segmentation image data IMD2-1, the second subset corresponding to the determined target geometry in the segmentation image IMG2-$n$. The training process is performed in respect of the target geometry determined in the corresponding sets of source data. In the present example, the training process is performed on the selected subset of the first image data IMD1-1 and the first segmentation image data IMD2-1.

A check is performed to determine if the first segmentation image data IMD2-1 is available (BLOCK 130). As described herein, the first segmentation image data IMD2-1 is captured by the second imaging device 37 which comprises a non-visible electromagnetic radiation sensor. The first segmentation image data IMD2-1 is used to generate the target segmentation data SGDT-n. The target segmentation data SGDT-n comprises the key image IMK1-$n$ which is used as a ground-truth for the training process. If the first segmentation image data IMD2-1 is available, the training process may comprise modifying the keying parameters applied by the keying algorithm (BLOCK 135). At least in certain embodiments, the keying parameters may be optimised to improve the key image IMK1-$n$ defined by the target segmentation data SGDT-n.

The first image data IMD1-1 is analysed to determine an occluded sub-target within the target geometry (BLOCK 140). The sub-target in the present scenario comprises the advertising board 5 in the first image IMG1-$n$. The advertising board 5 may be partially or wholly occluded by a person, a player or an object, for example. One or more separation parameters may be modified for processing the occluded sub-target (BLOCK 145). The first image data IMD1-1 is analysed to determine an un-occluded sub-target within the target geometry (BLOCK 150). The sub-target is un-occluded if there are no obstacles disposed in front of the advertising board 5. An image separation algorithm is applied to segment the first image IMG1-*n*. The un-occluded sub-target determined within the target geometry is added to the key (BLOCK 155). A check is performed to determine if the sub-target within the target geometry is sufficiently keyed (BLOCK 160). The check may be performed automatically, for example by comparing the key image to an advertising board model. If the sub-target is determined to have been sufficiently keyed, the target segmentation data SGDT-n is output. If the sub-target is determined not to have been sufficiently keyed, the process is repeated to determine the occluded sub-target within the target geometry (BLOCK 140). The process is repeated until the sub-target is determined to have been sufficiently keyed.

The first image data IMD1-1 and the target segmentation data SGDT-n in the first training data set TRD-n are read by the segmentation model 2 (BLOCK 165). The scene is tracked (BLOCK 170). For example, tracking information is generated to indicate the angle of the first imaging device 15 (about one or more of the X, Y and Z axis) and/or the zoom of the first imaging device 15. The tracking information is generated at the same time as the first image data IMD1-1. A check is performed to determine if a tracking confidence is sufficient (BLOCK 175). The tracking confidence is checked to avoid using image frames for which tracking is not sufficiently accurate. This check helps to reduce or avoid training of the segmentation model 2 using mis-tracked first images IMG1-1. The target geometry is projected (BLOCK 180). The learning algorithm checks the form of the target segmentation data SGDT-n (BLOCK 185). The target segmentation data SGDT-n is derived either from the segmentation image data IMD2-*n* (BLOCK 190); or from the application of an image separation algorithm to the first image data IMG1-*n* (BLOCK 195). The segmentation model 2 may receive the background composition data set BGD-n defining the geometry of the sports stadium or playing area 31 (BLOCK 185).

Alternatively, or in addition, the segmentation model 2 may receive sample image data IMSD1. The sample image data IMSD1 may represent one or more sample image occurring in the background of one or more of the first images IMG1-1. The provision of the sample image data IMSD1 may facilitate training of the segmentation model 2 to differentiate between the foreground area FG1 and the background area BG1. The sample image data IMSD1 may represent the graphical images displayed on the advertising board 5 as the original content 27 (BLOCK 200). The sample image data IMSD1 may be limited to images displayed when the first image IMG1-*n* is captured, for example one or more images displayed during a particular sporting event. Alternatively, the sample image data IMSD1 may comprise a library of images displayed on the advertising board 5. The library of images may be updated dynamically, for example by identifying and extracting an image displayed on the advertising board 5. The displayed image may be determined within the first image IMG1-*n* using the target segmentation data SGDT-n. The sample image data IMSD1 may, for example, comprise one or more images output for display during a sporting event. By providing the sample image data IMSD1 representing the original content 27 displayed on the advertising board 5, the segmentation of the first image data IMD1-1 to determine the advertising board 5 may be facilitated. At least in certain embodiments, the sample image data IMSD1 may help the segmentation model 2 to segment the first image IMG1-*n*. The sample image data IMSD1 may comprise one or more graphical images. The segmentation model 2 may utilise the or each graphical image to perform the segmentation operation. This approach may be used to facilitate training of the segmentation model 2, for example where limited or insufficient relevant background information is available. This technique may be used to generate synthetic training material for training the segmentation model 2. The sample image data IMSD1 may comprise additional images to generate the synthetic training material for cases where real data is not available. The sample image data IMSD1 may comprise images, such as advertising images, which are used to generate new training data to train the segmentation model 2 to segment the first image IMG1-*n*, for example to differentiate between the images represented by the sample image data IMSD1 and objects or areas of interest in the foreground, such as a player or a ball. The sample image data IMSD1 is not required by the segmentation model 2.

The target geometry is sub-divided into a plurality of blocks (BLOCK 205). The segmentation model 2 is applied to the blocks of the target geometry determined in the first image data IMD1-1. The blocks of interest are determined (BLOCK 210). The segmentation model 2 processes each block of the target geometry to generate candidate segmentation data SGDC-n (BLOCK 215). The candidate segmentation data SGDC-n represents a candidate segmentation of the first image IMG1-*n*. The candidate segmentation data SGDC-n is stored for each block of the target geometry (BLOCK 220).

The candidate segmentation is compared to the target segmentation. In the present scenario, the target segmentation represents the ground-truth segmentation of the first image IMG1-*n*. The training algorithm seeks to modify the segmentation model to reduce discrepancies between the candidate segmentation and the target segmentation. The training algorithm implements an error calculation function which determines a first error representing differences between the candidate segmentation and the target segmentation. The first error may comprise or consist of a first error magnitude. A first training output may be generated in dependence on the determined first error. The training output may represent the determined first error. The segmentation model is updated in dependence on the determined first error. The training algorithm modifies the weight of the one or more model parameters to reduce the error. This process may be performed in respect of each block of the target geometry. The segmentation model 2 is updated using the modified weight of the one or more model parameters. The updated segmentation model 2 is stored.

The training algorithm performs a check for additional source data (BLOCK 225). The training algorithm selects the next available set of source data for processing. In the present embodiment, a second training data set TRD-2 is determined. The second training data set TRD-2 comprises a second set of the first image data IMD1-2 and a second set of the segmentation image data IMD2-2. The procedure is repeated in respect of the second training data set TRD-n using the updated segmentation model 2. The segmentation image data IMD2-2 is processed to generate a second target segmentation. The updated segmentation model 2 segments the first image data IMD1-2 to generate a second candidate segmentation. The training algorithm compares the second candidate segmentation and the second target segmentation and determining a second error. The second error may comprise or consist of a second error magnitude. A second training output may be generated in dependence on the determined second error. The second training output may, for example, represent the determined second error. The segmentation model is updated in dependence on the determined second error. In particular, the weight of the one or more model parameters is modified to reduce the error. The segmentation model 2 is updated in dependence on the modified one or more model parameters. Updating the segmentation model may comprise adjusting the weight of one or more model parameters to reduce the determined error. This process is repeated in respect of each of the available sets of source data. The segmentation model 2 is thereby progressively updated to provide improved segmentation of the first image IMG1-*n*.

The first image data IMD1-1 provided in the first training data set TRD-1 may represent a first image IMG1-1. In this example, the first image IMG1-1 comprises a first foreground area FG1 and a first background area BG1. The second image data IMD1-2 provided in the second training data set TRD-2 may represent a second image IMG1-2. In this example, the second image IMG1-2 consists of either a second foreground area FG2 or a second background area BG2. The segmentation model 2 may be trained using one or more of the first training data set TRD-1 and/or one or more of the second training data set TRD-2.

In a variant, the first image IMG1-1 and the second image IMG1-2 may be selected from the same source image data IMD1-*n*. The first image IMG1-1 and the second image IMG1-2 may comprise different first and second regions of the same source image. The coordinates of the first image IMG1-1 and the second image IMG1-2 may be pre-defined, for example.

Image Separation

The training process outlined above utilises the target segmentation data SGDT-n for training the segmentation model 2. The target segmentation data SGDT-n is used as a ground truth used by the training algorithm to assess and iteratively modify the segmentation model 2. The target segmentation data SGDT-n in the above embodiment is derived from the segmentation image data IMD2-*n* captured by the second image capture device 37. If the first segmentation image data IMD2-1 is not available, the training process may process the first image data IMD1-1 to generate suitable target segmentation data SGDT-n. It has been recognised that the ground truth may be determined in dependence on the analysis of image data captured by at least one optical camera configured to capture light in the visible spectrum. The target segmentation data SGDT-n can be derived from the first image data IMG1-*n* by application of an image separation algorithm. The ground truth for training the segmentation model 2 may be defined in dependence on the target segmentation of the first image IMG1-*n* by the image separation algorithm. The image separation algorithm may implement chroma-keying and/or shape detection techniques to derive the target segmentation data SGDT-n from the first image IMG1-*n*. The image separation algorithm in the present embodiment is a chroma-keying algorithm. The image separation algorithm may be supplied with one or more separation parameters. A plurality of separation parameters may be supplied which are different from each different, for example in respect of different operating regions of the first image IMG1-*n*. Alternatively, or in addition, the separation parameter may change over time.

The first image data IMD1-1 is processed by the image separation algorithm to generate the target segmentation data SGDT-n. The image separation algorithm in the present embodiment comprises a chroma-keying algorithm which segments the first image IMG1-*n* based on colour hues. The image separation algorithm comprises one or more separation parameters which may be applied to segment the first image IMG1-*n*. The one or more separation parameters may be determined in respect of part or all of the first image IMG1-*n*. The one or more separation parameters may, for example, comprise one or more of the following: colour, brightness, intensity, and luminance. The one or more separation parameters may be predefined or may be determined dynamically. The one or more separation parameters may be predefined in dependence on a display colour emitted as the blinking image described herein. The one or more separation parameters may be determined in dependence on one or more spatial parameter; and/or one or more temporal parameter. At least in certain embodiments the spatial parameter(s) and/or the temporal parameter(s) may facilitate operation of the image separation algorithm to generate the target segmentation data SGDT-n. For example, the spatial parameter (s) and/or the temporal parameter(s) may be used to select the at least one separation parameter applied by the image separation algorithm. The at least one determined separation parameter may facilitate identification of a key corresponding to a background area of the first image. The one or more separation parameters may be determined dynamically to take account of the prevailing conditions and/or ambient lighting. The one or more temporal parameter may, for example, define a time of day for capture of the first image IMG1-*n* and/or a date of capture of the first image IMG1-*n*.

The one or more spatial parameter may define geospatial data. Alternatively, or in addition, the spatial parameter may define a sub-section of the first scene SC1. The spatial parameter may, for example, sub-divide the first scene SC1 into a plurality of sub-sections. The sub-sections may be predefined, for example in a grid arrangement. Alternatively, the sub-sections may be determined dynamically, for example to differentiate between regions of the first scene SC1 having different ambient lighting conditions. The image separation algorithm may apply different separation parameters in respect of each sub-section identified within the first scene SC1. The spatial parameter may define the location of at least a portion of the captured first scene SC1, for example to differentiate between a shaded location and an unshaded location inside a stadium. A first sub-section may be identified having a high ambient lighting (such as an area in direct sunlight); and a second sub-section may be identified having a low ambient lighting (such as an area in shade). One or more temporal parameter(s) may be used in conjunction with the spatial parameter(s) to determine appropriate separation parameters for each sub-section. The separation parameters in each sub-section may be selected in dependence on the ambient lighting detected in each sub-section of the first scene SC1.

The one or more separation parameters may be applied globally for processing of the first image data IMD1, for example the one or more separation parameters may be fixed for analysis of the entirety of the first image IMG1-*n*. Alternatively, the one or more separation parameters may be variable within the first image data IMD1, for example the one or more separation parameters may be modified in dependence on an angular orientation and/or spatial location of the first imaging device 15. The one or more separation parameters may be applied locally to a sub-section of the first image. The one or more separation parameters may be modified to take account of changing lighting conditions within the first image IMG1-$n$.

Figure 9:
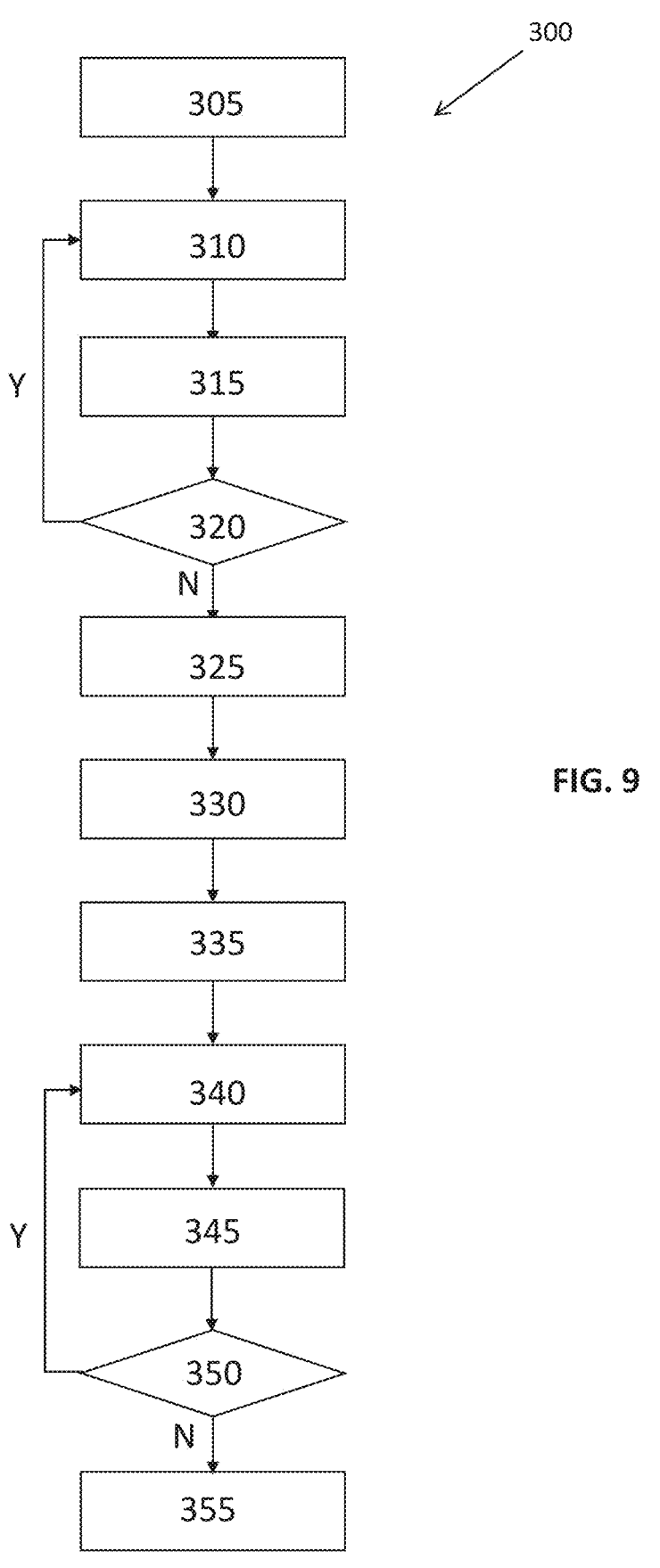
FIG. 9 is a second block diagram representing the training of the segmentation model using an image separation algorithm.

The application of an image separation algorithm to train the segmentation model will now be described with reference to a second block diagram 300 shown in FIG. 9. The image separation algorithm may be used instead of or in addition to the techniques described herein for extracting the target segmentation data SGDT-n from the segmentation image data IMD2-$n$. The training process is started (BLOCK 305). A plurality of training data sets TRD-n is received (BLOCK 310). The first training data sets TRD-n each comprise at least one set of first image data IMD1-1. The first image data IMD1-1 represents a first image IMG1-$n$ comprising a first foreground area FG1 and a first background area BG1. The first foreground area FG1 represents the part of the first image IMG1-$n$ which is nearer to the first imaging device 15. The first background area BG1 represents the part of the first image IMG1-$n$ which is further from the first imaging device 15. The first image data IMD1-1 is captured by the first imaging device 15 which is a visible electromagnetic radiation imaging device 15.

The image separation algorithm processes the first image represented by the first image data IMD-1 to classify pixels (or pixel groups) in the first image IMG1-$n$ as relating to the first foreground area FG1 or the first background area BG1. The pixels having the same classification are identified as relating to the same semantic area in the first image IMG1-$n$ image semantic areas. The resulting first image semantic areas IMS-1 are used to define a target segmentation for the segmentation model. The first image data IMD1-1 is processed using the image separation algorithm to generate the first target segmentation (BLOCK 315). A check may be performed to determine if an additional set of the first image data IMD1-1 is available (BLOCK 320). The image separation algorithm processes each available set of the first image data IMD1-1. The first training data set TRD-1 is processed using the segmentation model. The processing of the first training data set TRD-1 comprises processing the first image data IMD1-1 using the segmentation model to generate a first candidate segmentation SGDC-1 (BLOCK 325). A comparison is performed between the first candidate segmentation GDC-1 and the first target segmentation SGDT-1 (BLOCK 330). A first error is determined in dependence on the comparison (BLOCK 335). The determined first error is output (BLOCK 340). The segmentation model is updated in dependence on the determined first error (BLOCK 345). Updating the segmentation model may comprise adjusting the weight of one or more model parameters to reduce the determined error. A check may be performed to determine if an additional set of the first training data set TRD-1 is available (BLOCK 350). Each available first training data set TRD-1 is processed. The segmentation model is updated in dependence on each of the first training data set TRD-1. The training process is an iterative process that typically continues while the segmentation model improves (BLOCK 355).

The image separation algorithm comprises one or more separation parameters which determine the segmentation of the first image IMG1-$n$. The one or more separation parameters may be global parameters which are applied to the or each set of first image data IMD1-1 in the first training data set TRD-n. Alternatively, the one or more separation parameters may be local parameters which are defined in respect of each set of first image data IMD1-1 in the first training data set TRD-n. At least in certain embodiments, the one or more separation parameter may be variable. In particular, the one or more separation parameters may be dynamically adjusted to adjust the segmentation of the first image IMG1-$n$. The at least one separation parameter may be determined in dependence on a spatial parameter and/or a temporal parameter. The spatial parameter may comprise or consist of geospatial data defining a location of the first imaging device 15 when the first image data IMD1-$n$ was captured. The spatial parameter may comprise or consist of geospatial data defining a location of the first imaging device 15 when the first image data IMD1-$n$ was captured. Alternatively, or in addition, the spatial parameter may define a boundary or extremity of the first image. The spatial parameter and/or the temporal parameter may be used to characterise the prevailing light conditions in different regions of the first scene SC1.

Dynamic Image Separation

Figure 10:
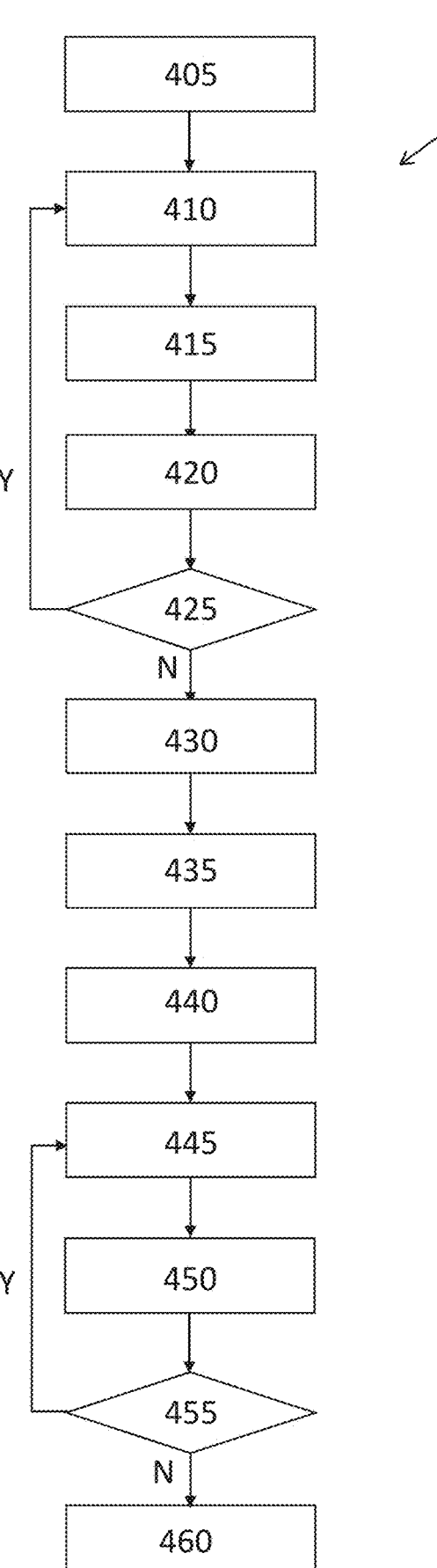
FIG. 10 is a third block diagram representing the training of the segmentation model using a dynamic image separation algorithm.

The application of a dynamic image separation algorithm to train the segmentation model will now be described with reference to a third block diagram 400 shown in FIG. 10. The training process is started (BLOCK 405). A plurality of training data sets TRD-n is received (BLOCK 410). The first training data sets TRD-n each comprise at least one set of first image data IMD1-1. The first image data IMD1-1 represents a first image IMG1-$n$ comprising a first foreground area FG1 and a first background area BG1. The first foreground area FG1 represents the part of the first image IMG1-$n$ which is nearer to the first imaging device 15. The first background area BG1 represents the part of the first image IMG1-$n$ which is further from the first imaging device 15. The first image data IMD1-1 is captured by the first imaging device 15 which is a visible electromagnetic radiation imaging device 15. The training data sets TRD-n in this embodiment also comprises at least one separation parameter specifying a property of the first image data. The one or more separation parameters may, for example, comprise one or more of the following: colour, brightness, intensity, and luminance. The at least one separation parameter may be determined in dependence on at least one spatial parameter and/or at least one temporal parameter. The one or more separation parameters may be determined dynamically to take account of the prevailing conditions and/or ambient lighting. The at least one temporal parameter may, for example, define a time of day for capture of the first image IMG1-$n$. Alternatively, or in addition, the spatial parameter may define a geospatial location of the first scene captured in the first image IMG1-$n$. The spatial parameter may define a location where the first image IMG1-$n$ was captured.

The image separation algorithm is operative to segment the image data IMD-1 into one or more image semantic areas. The resulting image semantic areas are used to define a target segmentation for the segmentation model. The one or more separation parameters is read by the at least one processor (BLOCK 415).

The first image data IMD1-1 is processed using the image separation algorithm to generate a first target segmentation data SGDT-n (BLOCK 420). In the present embodiment the image separation algorithm processes the first image data in dependence on the at least one separation parameter. A check may be performed to determine if an additional set of the first image data IMD1-1 is available (BLOCK 425). The image separation algorithm processes each available set of the first image data IMD1-1. The first training data set TRD-1 is processed using the segmentation model. The processing of the first training data set TRD-1 comprises processing the first image data IMD1-1 using the segmentation model to generate a first candidate segmentation SGDC-1 (BLOCK 430). A comparison is performed between the first candidate segmentation SGDC-1 and the first target segmentation SGDT-1 (BLOCK 435). A first error is determined in dependence on the comparison (BLOCK 440). A first training output may be generated in dependence on the determined first error (BLOCK 445). The first training output may, for example, represent the determined error. The segmentation model is updated in dependence on the determined first error (BLOCK 450). Updating the segmentation model may comprise adjusting the weight of one or more model parameters to reduce the determined error. A check may be performed to determine if an additional set of the first training data set TRD-1 is available (BLOCK 455). Each available first training data set TRD-1 is processed. The segmentation model is updated in dependence on each of the first training data set TRD-1. The training process is an iterative process that typically continues while the segmentation model improves. The training process is stopped (BLOCK 460).

Image Segmentation Process

The segmentation model 2 is operable to segment the first image IMG1-$n$ into a plurality of the first image semantic areas IMS-n. The operation of the segmentation model 2 will now be described with reference to a first image IMG1-1 shown in FIG. 8A. The first image IMG1-1 represents a first scene comprising at least one foreground image area IMOF-1 and at least one background image area IMOB-1. The or each foreground image area IMOB-1 may comprise or consist of a subject of interest in the foreground of the first image IMG1-$n$. The foreground image area IMOF-1 in the first image IMG1-$n$ comprises a first player P1. The or each background image area IMOB-1 may comprise or consist of a subject of interest in the background of the first image IMG1-$n$. The background image area IMOB-1 in the first image IMG1-$n$ comprises an advertising board 5. The segmentation model 2 is operable to segment the first image IMG1-$n$ to determine the at least one foreground image area IMOF-1 and/or the at least one background image area IMOB-1. Alternatively, or in addition, the segmentation model 2 is operable to segment the first image IMG1-$n$ to determine at least one foreground image area IMOF-1 representing the first player P1. The segmentation model 2 is operable to segment the first image IMG1-$n$ to determine and extract a background image area IMOB-1 representing the advertising board 5. The advertising board 5 in the illustrated example is partially occluded by the first player P1 and this is represented by the foreground and background areas IMOF-1, IMOB-1.

In certain scenarios, the first image IMG1-$n$ may comprise at least one mixed image area. The segmentation model 2 is configured to segment the first image IMG-1 to determine the at least one mixed image area. A mixed image area may, for example, correspond to an object, such as a ball, which is moving faster than an exposure rate of the first image capture device 15 resulting in a motion blur. The moving object may be captured in the foreground of the first image. However, the motion blur may be a mixture of the foreground and the background of the first image. The segmentation model identifies the mixed image area as occurring simultaneously in the foreground area FG1 and the background area BG1 of the first image IMG1-$n$.

Figure 8C:
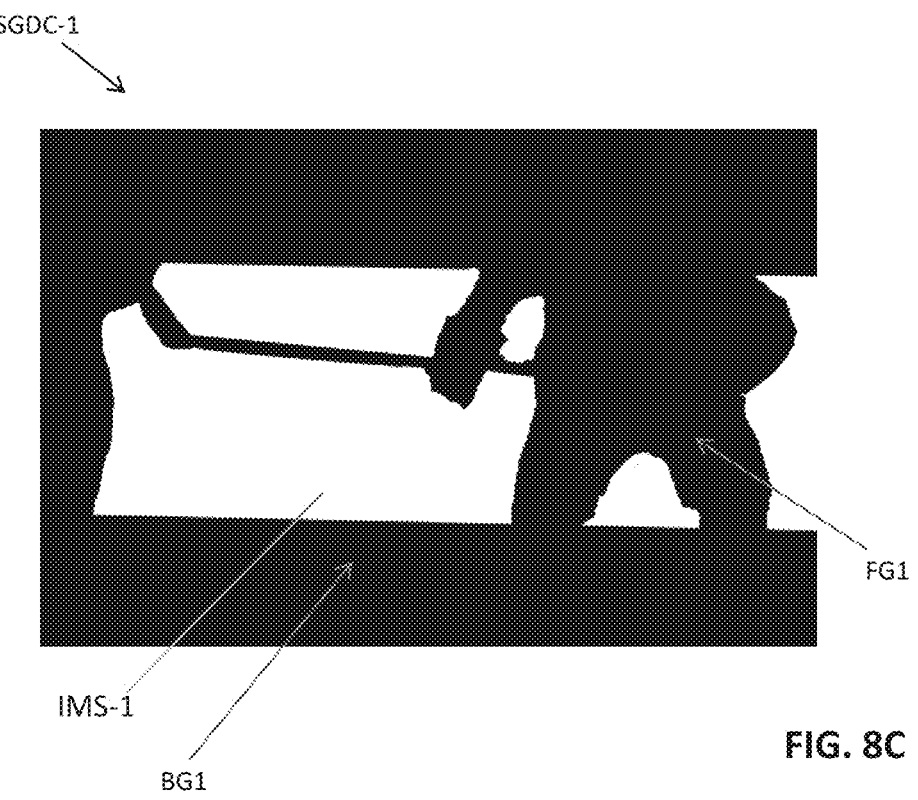
FIG. 8C shows a candidate segmentation image generated by the segmentation model processing the first image shown in FIG. 8A.

The semantic areas IMS-n determined by the segmentation model 2 are used to generate a key image IMK1-$n$ representing the geometry of the advertising board 5. An example of a key image IMK1-$n$ is illustrated in FIG. 8C. The key image IMK1-$n$ represents the geometry of the advertising board 5 and can be used as a mask for overlaying the overlay image data OVD1.X The key image IMK1-$n$ in the present embodiment is a black and white image, but other colours are contemplated. As illustrated in FIG. 1, the overlay image data OVD1 is applied to the first image IMG1-$n$ using the key image IMK1-$n$ as a mask. The overlay image data OVD1 changes the appearance of the advertising board 5 in the resulting composite image IMC1.

In this example, the content replacement system 3 is configured to receive video images IMG1-$n$ from the first image capture device 15 and to output modified (amended) video images in the form of the first composite image IMC1. The content replacement system 3 may be combined with a vision mixer or may be provided as a separate and isolated piece of equipment. The content replacement system 3 may be provided in the immediate vicinity of the vision mixer or may be located remotely. The content replacement system 3 may receive video images directly from the vision mixer, or via one or more intermediate pieces of equipment. The input video images IMG1-$n$ may be recorded and then processed by the content replacement system 3 later, and/or the output composite images IMG1-$n$ may be recorded and provided to the vision mixer later. A graphics layers may be added to these modified video images through a graphics overlay unit to create a modified first composite image IMC1 for output.

Supplementary Training Data

It has been recognised that the available image data IMD1-$n$ may be supplemented by augmenting the available first images IMG1-$n$ with alternative image data. In the present embodiment, a first overlay image data OVD1 is overlayed onto a portion of the first image IMG1-$n$ to generate a first composite image IMC1 which is different from the source image data. The first composite images IMC1 is an augmented image, for example forming an "augmented background" that can be used as training data for the segmentation model 2. This approach may, for example, enable existing digital content, such as advertising images or videos to be overlayed onto the first image data IMG1-$n$ to create new training data.

The training of the segmentation model 2 has been described with reference to the processing of the first image IMG1-$n$ captured by the first image capture device 15. This process may be modified by using the composite image data IMCD1-$n$ for one or more training operation. The segmentation model 2 can segment a composite image IMC1 into one or more image semantic areas IMS-n. The composite image IMC1 may be derived in accordance with one or more of the techniques described herein. The target segmentation data SGDT-n derived from the segmentation image IMG2-$n$ may be used to define a key image IMK1-$n$ used to apply overlay image data OVD1 onto the first image IMG2-$n$ to form the composite image IMC1. A plurality of the composite images IMC1 may be generated by applying different overlay image data OVD1. In the present embodiment, a plurality of sets of supplementary image data are provided to augment the raw first image data IMD-1 to form the composite image IMC1. A different overlay image is defined by each set of the overlay image data OVD1. Consequently, the composite images IMC1 formed by overlaying the overlay image data OVD1 onto the first image data IMD-1 are different from each other. This approach can be used to increase the available training data sets TRD-n for training the segmentation model 2. It will be understood that the target segmentation data SGDT-n is the same for each of the composite images IMC1.

The target segmentation data SGDT-n may be derived from the processing of the first image data IMD1-$n$ or the segmentation image data IMD2-$n$ (if available). The target segmentation data SGDT-n defines one or more semantic areas IMS-n which are used as a mask for application of an overlay to replace or modify a portion of the first image IMG1-$n$. The mask may, for example, comprise a key image IMK1-$n$. The content replacement system 3 in the present embodiment is configured to replace one or more of the determined semantic areas IMS-n with part or all of the overlay image data OVD1. The overlay image data OVD1 may, for example, be overlayed onto the masked portion of the first image data IMD1-$n$ corresponding to the advertising board 5. The resulting composite image IMC1 is a modified version of the first image represented by the first image data IMD1-$n$. For example, the image displayed on the advertising board 5 may be different from that of the source image. This process may be repeated using different sets of supplementary image data. The resulting composite images IMC1 are then used to train the segmentation model.

Figure 11:
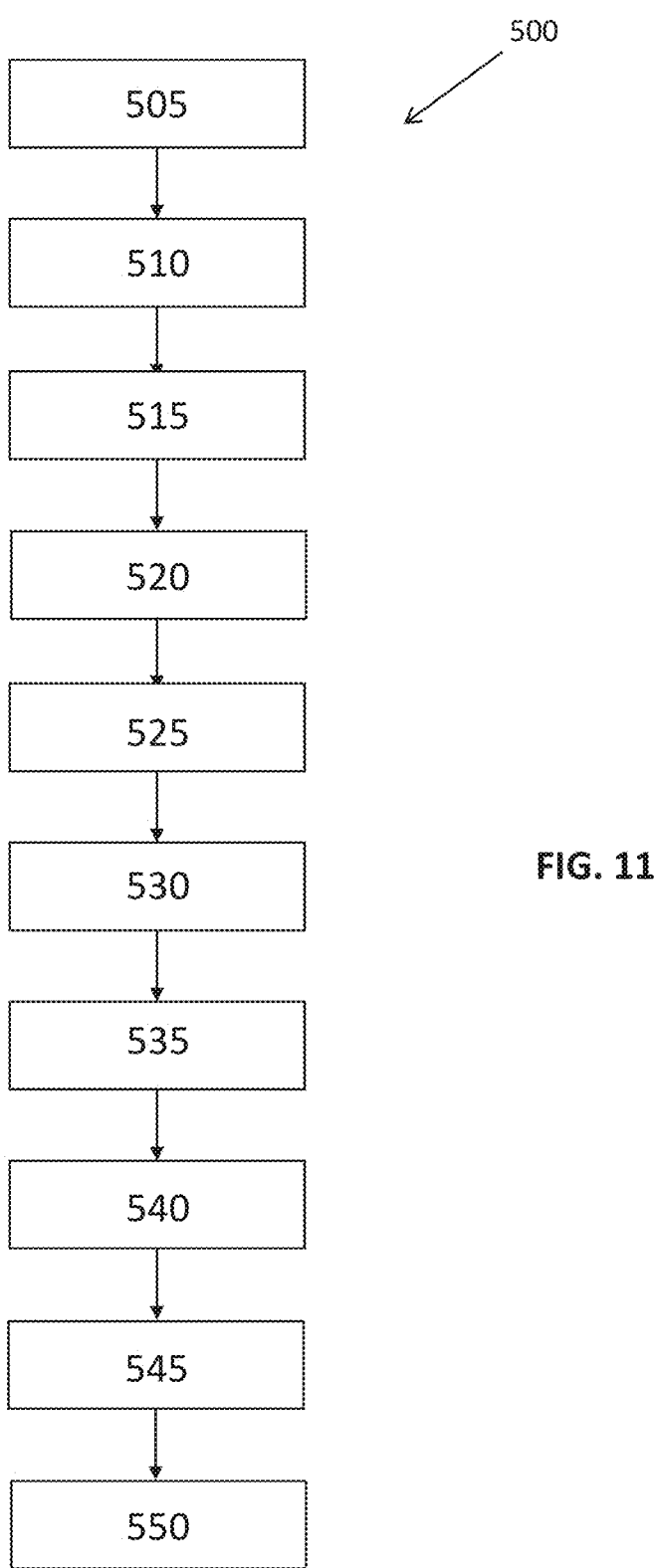
FIG. 11 is a fourth block diagram representing the training of the segmentation model using overlay image data.

The training of the segmentation model using the overlay image data OVD1 will now be described with reference to the fourth block diagram 500 shown in FIG. 11. The training process is started (BLOCK 505). A plurality of training data sets TRD-n is received (BLOCK 510). The first training data sets TRD-n each comprise at least one set of first image data IMD1-1. The first image data IMD1-1 represents a first image IMG1-$n$. The first image IMG1-$n$ may, for example, comprise a first foreground area FG1 and a first background area BG1. The first image data IMD1-1 is captured by the first imaging device 15 which is a visible electromagnetic radiation imaging device 15.

The method comprises segmenting the first image IMG1-$n$ represented by the first image data IMD1-$n$ (BLOCK 515). The at least one semantic area IMS-n may be determined using the image separation algorithm and/or the segmentation model 2 described herein. Alternatively, or in addition, the at least one semantic area may be determined in dependence on the first segmentation image data IMD2-1. The first segmentation image data IMD2-1 may be used to generate the target segmentation data SGDT-n corresponding to the first image represented by the first image data IMD1-1. Other techniques may be employed to segment the first image IMG1-$n$ represented by the first image data IMD1-1.

The target segmentation data SGDT-n is used as a key image IMK1-$n$ for augmenting the first image data IMD1-$n$. The first image data IMD1-1 is augmented by applying a first overlay image to the at least one determined sub-section of the first image IMG1-$n$ to generate a first composite image IMC1 (BLOCK 520). The first composite image IMC1 is defined by the first composite image data IMCD1-1. The first composite image data IMCD1-1 is processed using the segmentation model (BLOCK 530). The segmentation model may process the first composite image data IMCD1-1 to generate a first candidate segmentation SGDC-1. A comparison may be performed between the first candidate segmentation SGDC-1 and the first target segmentation SGDT-1. A first error may be determined in dependence on the comparison. A first training output may be generated in dependence on the determined first error. The first training output may, for example, represent the determined first error. The segmentation model is updated in dependence on the determined first error. Updating the segmentation model may comprise adjusting the weight of one or more model parameters to reduce the determined error. The segmentation model is updated in dependence on the first composite image data IMCD1-1 (BLOCK 535). A first updated segmentation model may be generated.

The first image data IMD1-1 may then be augmented by applying a second overlay image data OVD2 (which is different from the first overlay image data OVD1) to the at least one determined sub-section of the first image to generate second composite image data IMCD1-2 (BLOCK 540). The second composite image data IMCD1-2 is derived from the same first image data IMD1-1 as the first composite image data IMCD1-1. However, by applying the second, different overlay image, the resulting second composite image IMC2 is different from the first composite image IMC1. The second composite image data IMCD1-2 is processed using the first updated segmentation model (BLOCK 545). The first updated segmentation model is updated in dependence on the second determined error to generate a second updated segmentation model (BLOCK 550).

It will be understood that this process may be repeated using different supplementary image data. The available training data to train the segmentation model may be increased.

The composite image data IMC1 is processed to generate a third candidate segmentation data SGDC-3. The training algorithm compares the third candidate segmentation data SGDC-3 and the target segmentation data SGDT-1 to determine a third error. The third error may comprise or consist of a third error magnitude. A third training output may be generated in dependence on the determined third error, for example to represent the determined third error. The segmentation model is updated in dependence on the determined third error. In particular, the weight of the one or more model parameters is modified to reduce the error. The segmentation model 2 is updated in dependence on the modified one or more model parameters. This process is repeated in respect of each of the available sets of source data. The target segmentation data SGDT-n may optionally be derived from the first image IMG1-$n$, as described herein.

Data Annotation

The training data sets TRD-n may optionally comprise annotations to annotate the first images IMG1-$n$, for example to indicate that the first image consists solely of a background BG1 or a foreground FG1. By way of example, an annotation may indicate that the first image IMG1-$n$ comprises a background without occlusions. The annotation data can be used as an alternative (or as a supplementary) form of ground truth for training the segmentation model 2. The annotation effectively defines a target segmentation that can be used as a ground truth for comparison with a candidate segmentation generated by the segmentation model 2 during training. The first images IMG1-$n$ may be annotated using different techniques. At least in certain embodiments, the first images IMG1-$n$ may be annotated manually. For example, a user may review the first images IMG1-$n$ and manually annotate the first images IMG1-$n$. The annotation data may be generated in dependence on the user inputs. Other techniques may be used to annotate the first images IMG1-$n$.

The training data sets TRD-n used to train the segmentation model 2 comprise the first image data IMD1-$n$ and optionally also the segmentation image data IMD2-$n$. The first image data IMD1-$n$ represents a first image IMG1-$n$ comprising a first foreground area FG1 and/or a first background area BG1. The training data sets TRD-n may optionally also comprise an annotation data set AND-n for annotating the content of the first image. The annotation data set AND-n may, for example, indicate that the first image data IMD1-$n$ represents a first image IMG1-$n$ consisting exclusively of the first foreground area FG1 or the first background area BG1; or that the first image data IMD1-$n$ represents a first image IMG1-$n$ consisting of a combination of the first foreground area FG1 and the first background area BG1.

Alternatively, or in addition, the annotation data set AND-n may identify the first image IMG1-n as consisting exclusively of the first foreground area FG1 or the first background area BG1. For example, the annotation data set AND-n may identify the first image IMG1-n as consisting of an advertising board 5.

The training of the segmentation model 2 may be performed using at least one first training data set TRD-1 and/or at least one second training data set TRD-2. The or each first training data set TRD-1 comprises first image data IMD1-1 representing a first image IMG1-1. The first image IMG1-1 has a first foreground area FG1 and a first background area BG1. The or each second training data set TRD-2 comprises second image data IMD1-2 representing a second image IMG1-2. The second image IMG1-2 consists of either a second foreground area FG2 or a second background area BG2. The at least one first training data set TRD-1 and the at least one second training data set TRD-2 may comprise respective first and second annotation data sets AND-1, AND-2 for annotating the content of the first and second images IMG1-1, IMG1-2. The first annotation data set AND-1 may, for example, indicate that the first image IMG1-1 comprises the first foreground area FG1 and the first background area BG1. The second annotation data set AND-2 may, for example, indicate that the second image IMG1-2 consist of either the second foreground area FG2 or the second background area BG2.

It is efficient to provide training images that a human can identify as being purely foreground or purely background. The generation of the annotation data set AND-n may be generated more readily in these cases. The annotation data set AND-n may be used as an input to the segmentation model 2. Alternatively, or in addition, the annotation data set AND-n may be used by the training algorithm to determine the error of the candidate segmentation data SGDC-n. The annotation data set AND-n for a given training data set TRD-n may be supplied to the training algorithm. For example, the first image data IMD1-1 may represent a first image IMG1-n consisting of the background area BG1 (i.e. without a foreground area FG1). The associated annotation data set AND-1 may indicate that the first image data IMD1-n consists exclusively of the background area BG1. The training algorithm can determine the error in respect of any image semantic areas IMS-n determined in the candidate segmentation data SGDC-1 representing the foreground area FG1. Thus, the error may be determined using the associated annotation data set AND-1 with or without the associated target segmentation data SGDT-1. In a further example, the first image data IMD1-1 may represent a first image IMG1-n consisting of the foreground area FG1 (i.e. without a background area BG1). The associated annotation data set AND-1 may indicate that the first image IMG1-n consists exclusively of the foreground area FG1. Again, the error may be determined using the annotation data set AND-1.

Figure 12:
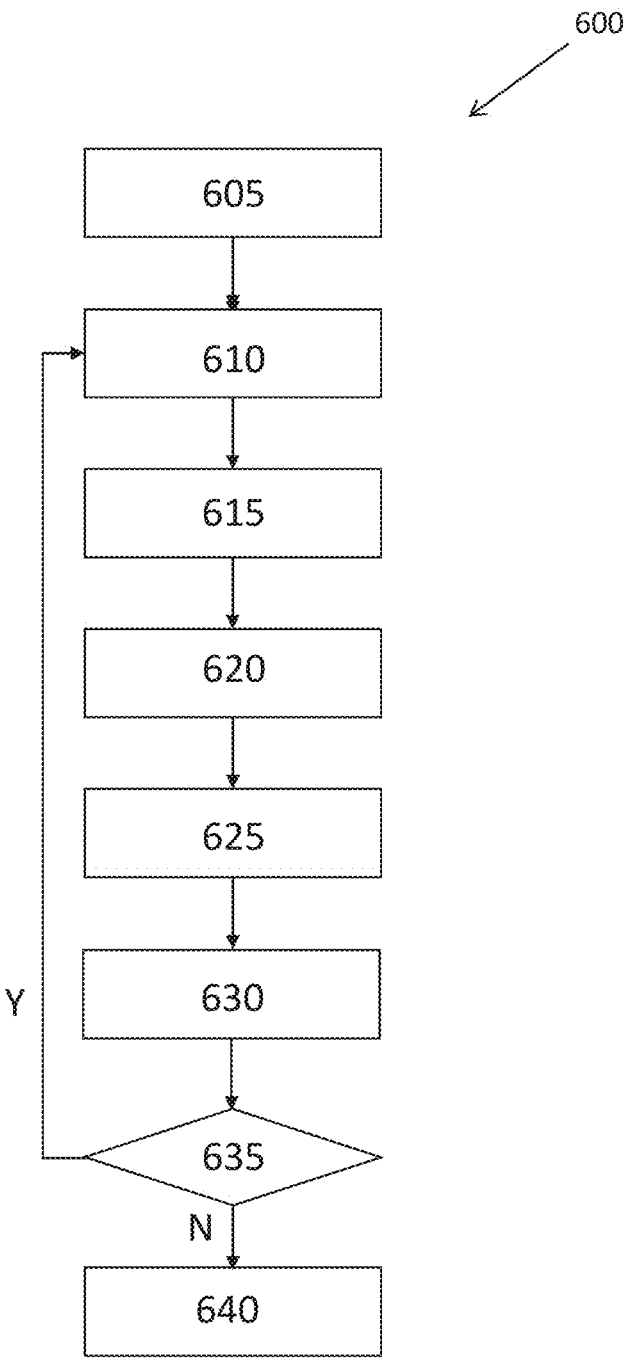
FIG. 12 is a fifth block diagram representing the training of the segmentation model using annotation data.

The training of the segmentation model using an associated annotation data set AND-1 will now be described with reference to a fifth block diagram 600 shown in FIG. 12. The training process is started (BLOCK 605). A plurality of training data sets TRD-n is received (BLOCK 610). The first training data sets TRD-n each comprise at least one set of first image data IMD1-1. The first image data IMD1-n represents a first image IMG1-n comprising a first foreground area FG1 and a first background area BG1. The first foreground area FG1 represents the part of the first image IMG1-n which is nearer to the first imaging device 15. The first background area BG1 represents the part of the first image IMG1-n which is further from the first imaging device 15. The first image data IMD1-n is captured by the first imaging device 15 which is a visible electromagnetic radiation imaging device 15. The first training data sets TRD-n also comprise first annotation data AND-1 associated with the first image data IMD1-n. The first annotation data AND-1 identifies the presence solely of the background or the foreground in the first image IMG1-n.

The first image data IMD-1 is processed using the segmentation model to segment the first image IMG1-n to generate a first candidate segmentation (BLOCK 615). A first error is determined in dependence on the first candidate segmentation and the first annotation data AND-1 (BLOCK 620). A first training output is generated in dependence on the determined first error (BLOCK 625). The segmentation model is updated in dependence on the first training output (BLOCK 630). A check may be performed to determine if an additional set of the first training data set TRD-1 is available (BLOCK 635). Each available first training data set TRD-1 is processed. The segmentation model is updated in dependence on each of the first training data set TRD-1. The training process is an iterative process that typically continues while the segmentation model improves. The training process is stopped (BLOCK 640).

Target Segmentation

The training of the segmentation model 2 has been described herein with reference to segmentation image data IMD2-n generated by the second imaging device 37. At least in certain embodiments, at least some of the training of the segmentation model 2 may be performed without access to the segmentation image data IMD2-n. For example, target segmentation data SGDT-n may be generated using other techniques, such as analysis of the first image data IMG1-n. The availability of tracking information, for example indicating the angle of the first imaging device 15 and/or the zoom of the first imaging device 15, may facilitate matching the generated target segmentation data SGDT-n to the first image data IMD1-n. The emitters 41 in the advertising board 5 may display a blinking (intermittent) image. The blinking image may be formed by visible and/or non-visible electromagnetic radiation. The blinking image may be displayed at predetermined intervals, for example once every frame of the video image. The blinking image may comprise or consist of visible electromagnetic radiation. The emitters 41 provided in the advertising boards 5 may be configured to emit visible electromagnetic radiation. The blinking image may be displayed for a period of time which is sufficiently short so as to be imperceptible to a viewer. The blinking image may consist of a single colour, for example composed of visible electromagnetic radiation of a predetermined colour. The predetermined colour may, for example, be blue or purple. In a variant, the blinking image may comprise a predefined pattern. The blinking image may be displayed for a period of time, such as 1 or 2 microseconds. The blinking image may be imperceptible to a person but may be determined through analysis of the image captured by a high-speed camera. This technique may result in a temporal offset between the target segmentation data SGDT-n and the first image data IMG1-n. At least in certain embodiments, this temporal offset is sufficiently small to reduce or minimise inconsistencies. A high-speed camera may, for example, capture 125 or 249 frames per second thereby reducing the temporal offset. The first image data IMG1-n which is processed for display may be the next available frame after detecting the blinking image for generation of the target segmentation data SGDT-n. Other techniques may be employed which do not require the second imaging device 37.

Overlay Segmentation

A graphical overlay may be applied to the source image to form a composite image. The graphical overlay is embedded in the composite image and the resulting image is referred to herein as an embedded overlay image). The graphical overlay may, for example, be applied by a broadcaster prior to transmission. The graphical overlay may comprise information, such as a score card, match (game) statistics or team information. Alternatively, or in addition, the graphical overlay may comprise graphical elements. The graphical overlay may comprise one or more of the following: alphanumerical characters, indicia, graphical elements, and logos. The graphical overlay may be static or dynamic. The graphical overlay may be opaque or partially transparent. The opacity of the graphical overly may be defined as alpha ($\alpha$) in the range 0% (completely transparent) to 100% (completely opaque).

It will be appreciated that various changes and modifications can be made to the present invention without departing from the scope of the present application.

The invention claimed is:

1. A computer-implemented training method for training a segmentation model to segment an image, the method comprising receiving a plurality of first training data sets, the first training data sets each comprising:
first image data representing a first image comprising a foreground and a background, the first image data being captured by at least one visible electromagnetic radiation imaging device;
wherein the method comprises, for each first training data set:
generating a first target segmentation for differentiating between the foreground and the background of the first image, the first target segmentation being generated in dependence on first segmentation data captured by at least one non-visible electromagnetic radiation imaging device, the first segmentation data identifying one or more subjects of interest occurring in the background of the first image; and
processing the first image data using the segmentation model, the processing of the first image data comprising:
processing the first image data to segment the first image and generate a first candidate segmentation;
comparing the first candidate segmentation and the first target segmentation to determine a first error; and
updating the segmentation model in dependence on the determined first error.

2. A computer-implemented training method as claimed in claim 1, wherein the first image comprises at least one foreground area occurring in the foreground of the first image, the segmentation model being configured to process the first image data to segment the first image to determine the at least one foreground area.

3. A computer-implemented training method as claimed in claim 1, wherein the first image comprises at least one background area occurring in the background of the first image, the segmentation model being configured to process the first image data to segment the first image to determine the at least one background area.

4. A computer-implemented training method as claimed in claim 1, wherein the first image comprises at least one mixed image area occurring in the foreground and the background of the first image, the segmentation model being configured to process the first image data to segment the first image to determine the at least one mixed image area.

5. A computer-implemented training method as claimed in claim 1, wherein the method comprises receiving a plurality of second training data sets, the second training data sets each comprising:
second image data, the second image data representing a second image consisting of either a foreground or a background, the second image data being captured by at least one visible electromagnetic radiation imaging device.

6. A computer-implemented training method as claimed in claim 5, wherein the method comprises, for each second training data set:
generating a second target segmentation for differentiating between the foreground and the background of the second image;
processing the second training data set using the segmentation model, the processing of the second training data set comprising:
processing the second image data to segment the second image to generate a second candidate segmentation;
comparing the second candidate segmentation and the second target segmentation to determine a second error; and
updating the segmentation model in dependence on the determined second error.

7. A computer-implemented training method as claimed in claim 5, wherein the second training data sets each comprise annotation data associated with the second image data, the annotation data identifying the presence solely of the foreground or the background in the second image;
wherein the method comprises, for each second training data set:
processing the second training data set using the segmentation model, the processing of the second training data set comprising:
processing the second image data to segment the second image to generate a second candidate segmentation;
using the annotation data to determine a second error for the second candidate segmentation; and
updating the segmentation model in dependence on the determined second error.

8. A computer-implemented training method as claimed in claim 1, wherein the method comprises:
processing the first image data to determine at least one segment of the first image;
augmenting the first image data by applying a first supplementary image data to the at least one determined segment to generate first augmented image data;
generating a first augmented training data set comprising the first augmented image data; and
introducing the first augmented training data set as one of the first training data sets.

9. A non-transitory computer-readable medium having a set of instructions stored therein which, when executed, cause a processor to perform the method claimed in claim 1.

10. An image segmentation system for segmenting an image, the image segmentation system comprising one or more processors; wherein the one or more processors is configured to implement a segmentation model trained according to the method claimed in claim 1.

11. A content replacement system for replacing the content of an image, the content replacement system comprising an image segmentation system as claimed in claim 10.

12. A system for training a segmentation model to segment an image, the system comprising at least one processor and at least one memory device, the at least one processor comprising at least one input configured to receive a plurality of first training data sets, the first training data sets each comprising:

first image data representing a first image comprising a foreground and a background, the first image data being captured by at least one visible electromagnetic radiation imaging device;

wherein, in respect of each of the plurality of first training data sets, the at least one processor is configured to:

determine a first target segmentation for differentiating between the foreground and the background of the first image, the first target segmentation being generated in dependence on first segmentation data captured by at least one non-visible electromagnetic radiation imaging device, the first segmentation data identifying one or more subjects of interest occurring in the background of the first image; and process the first image data using the segmentation model, the processing of the first image data comprising:

processing the first image data to segment the first image to generate a first candidate segmentation;

comparing the first candidate segmentation and the first target segmentation to determine a first error; and updating the segmentation model in dependence on the determined first error.

13. A system as claimed in claim 12, wherein the first image comprises at least one foreground area occurring in the foreground of the first image, the segmentation model being configured to process the first image data to segment the first image to determine the at least one foreground area.

14. A system as claimed in claim 12, wherein the first image comprises at least one background area occurring in the background of the first image, the segmentation model being configured to process the first image data to segment the first image to determine the at least one background area.

15. A system as claimed in claim 12, wherein the first image comprises at least one mixed image area occurring in the foreground and the background of the first image, the segmentation model being configured to process the first image data to segment the first image to determine the at least one mixed image area in the foreground and the background of the first image.

16. A system as claimed in claim 12, wherein the first target segmentation data identifies at least one subject of interest in the background of the first image.

17. A system as claimed in claim 12, wherein the at least one input is configured to receive a plurality of second training data sets, the second training data sets each comprising:

second image data, the second image data representing a second image consisting of either a foreground or a background, the second image data being captured by at least one visible electromagnetic radiation imaging device.

18. A system as claimed in claim 17, wherein, in respect of each of the plurality of second training data sets, the at least one processor is configured to:

determine a second target segmentation for differentiating between the foreground and the background of the second image;

process the second training data set using the segmentation model, the processing of the second training data set comprising:

processing the second image data to segment the second image to generate a second candidate segmentation;

comparing the second candidate segmentation and the second target segmentation to determine a second error; and updating the segmentation model in dependence on the determined second error.

19. A system as claimed in claim 17, wherein the second training data sets each comprise annotation data associated with the second image data, the annotation data identifying the presence solely of the foreground or the background in the second image;

wherein, in respect of each of the plurality of second training data sets, the at least one processor is configured to:

process the second training data set using the segmentation model, the processing of the second training data set comprising:

processing the second image data to segment the second image to generate a second candidate segmentation;

using the annotation data to determine a second error for the second candidate segmentation; and updating the segmentation model in dependence on the determined second error.

20. A system as claimed in claim 12, wherein, in respect of each of the plurality of second training data sets, the at least one processor is configured to:

process the first image data to determine at least one segment of the first image;

augment the first image data by applying a first supplementary image data to the at least one determined segment to generate first augmented image data;

generate a first augmented training data set comprising the first augmented image data; and introduce the first augmented training data set as one of the first training data sets.

21. An image processing system for processing an image, the image processing system comprising one or more processors having an electrical input for receiving first image data captured by at least one visible electromagnetic radiation imaging device and representing a first image comprising a foreground and a background;

wherein the one or more processors is configured to implement a segmentation model trained in accordance with the computer-implemented training method claimed in claim 1; the segmentation model being configured to segment the first image to differentiate between the foreground and the background of the first image.

22. A system as claimed in claim 12, wherein the first segmentation data is captured by at least one non-visible electromagnetic radiation imaging device configured to capture electromagnetic radiation in the near-infrared spectrum.

23. A computer-implemented training method as claimed in claim 1, wherein the first segmentation data is captured by at least one non-visible electromagnetic radiation imaging device configured to capture electromagnetic radiation in the near-infrared spectrum.

* * * * *